Nov. 6, 1934.                B. JORGENSEN                1,979,269
                              LASTING MACHINE
                           Filed July 29, 1932         10 Sheets-Sheet 3

Nov. 6, 1934.  B. JORGENSEN  1,979,269
LASTING MACHINE
Filed July 29, 1932  10 Sheets-Sheet 5
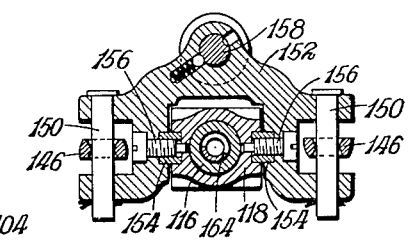
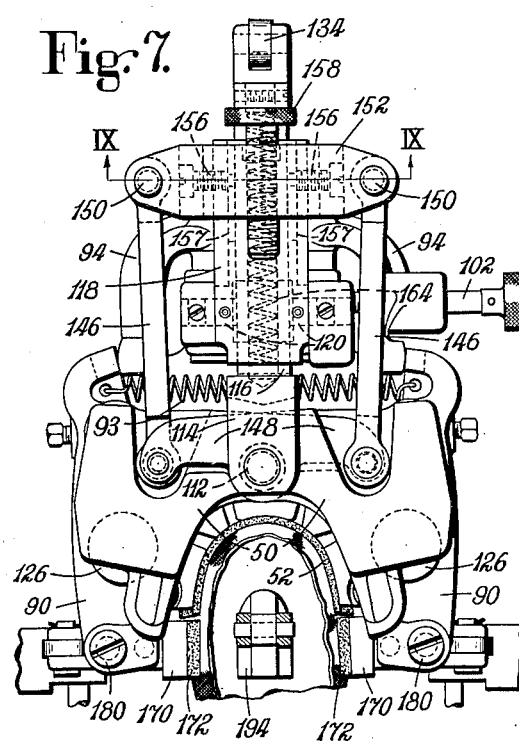
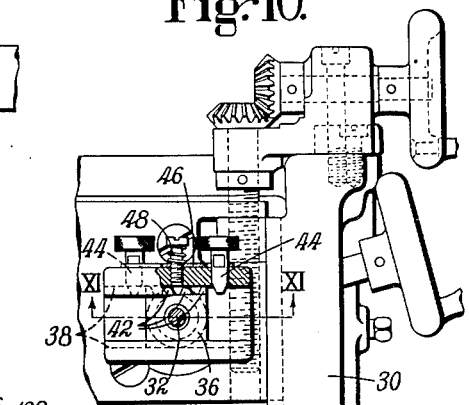
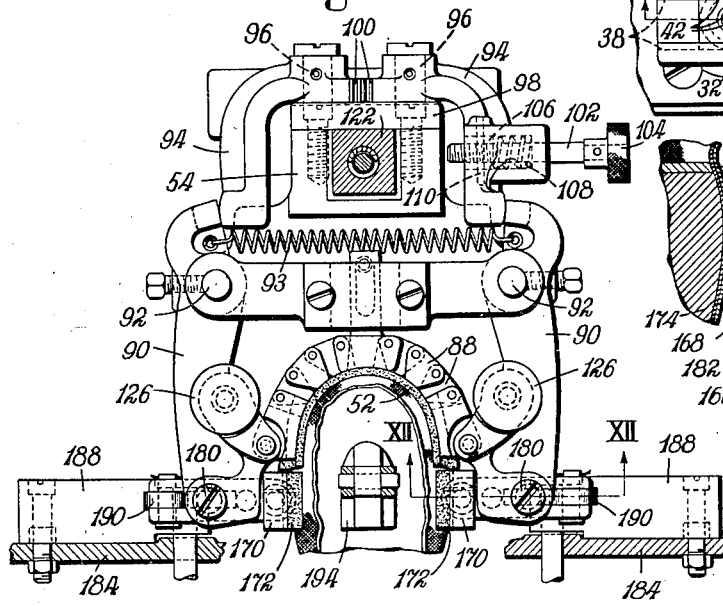

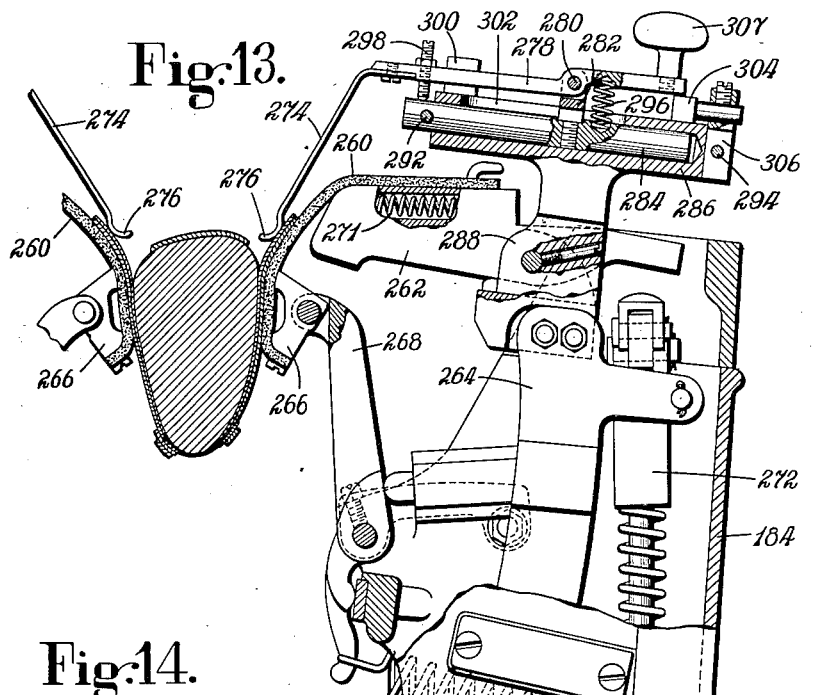
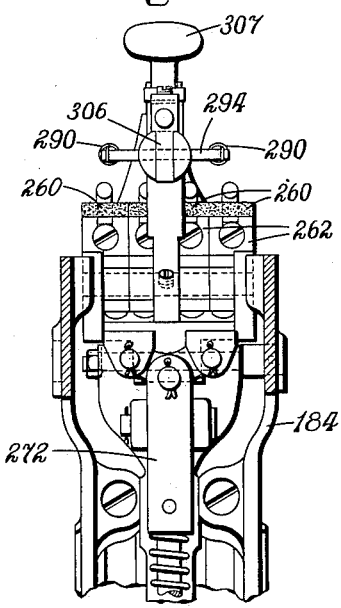
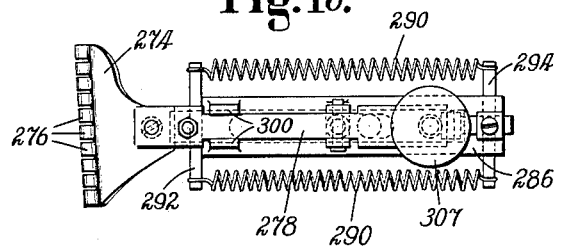

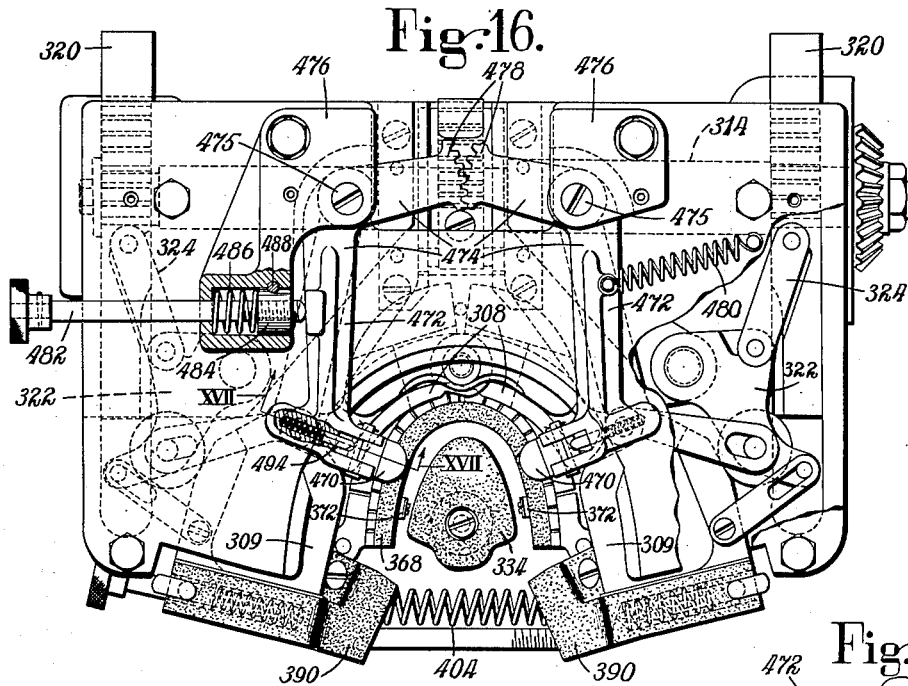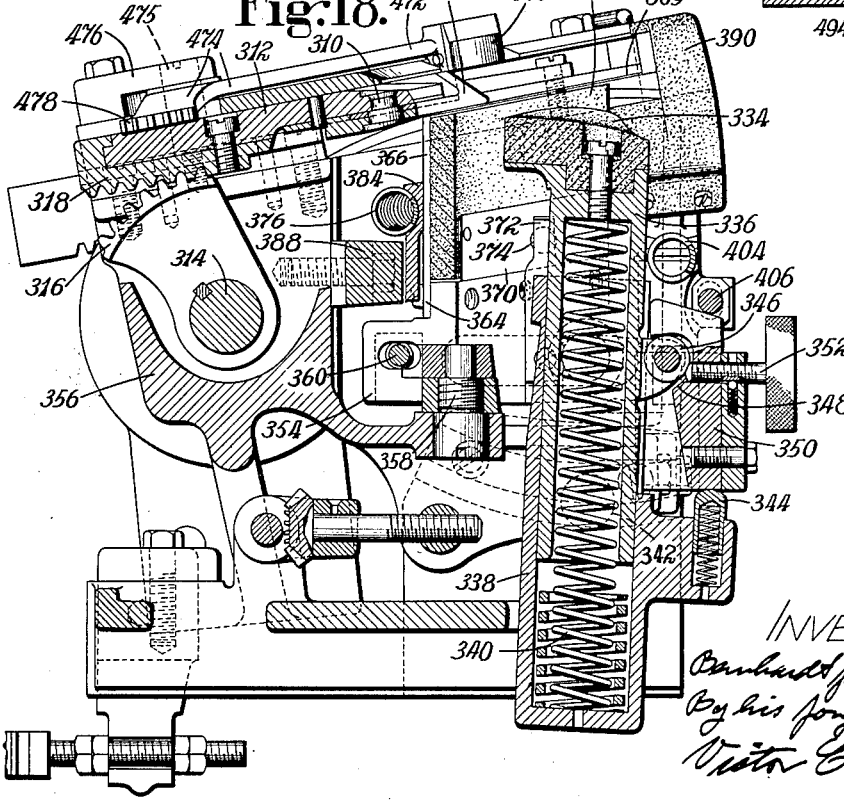

Nov. 6, 1934.  B. JORGENSEN  1,979,269
LASTING MACHINE
Filed July 29, 1932   10 Sheets-Sheet 8

Nov. 6, 1934.    B. JORGENSEN    1,979,269
LASTING MACHINE
Filed July 29, 1932    10 Sheets-Sheet 9

INVENTOR
Bernhardt Jorgensen
By his Attorney
Victor Colby

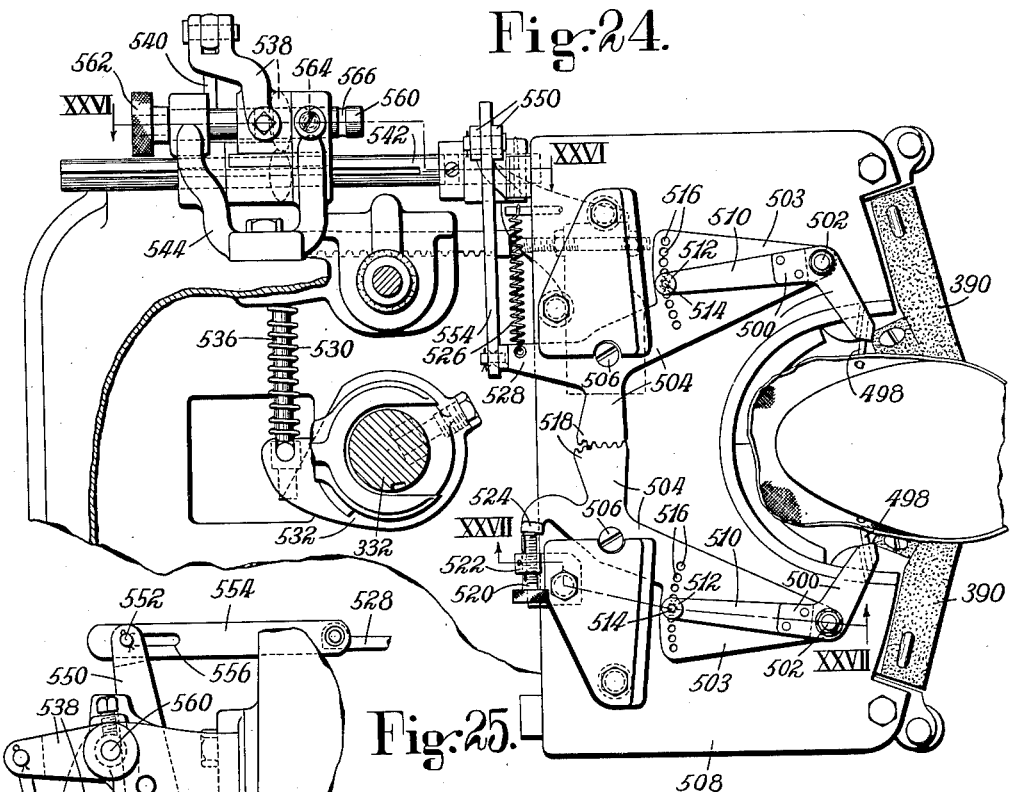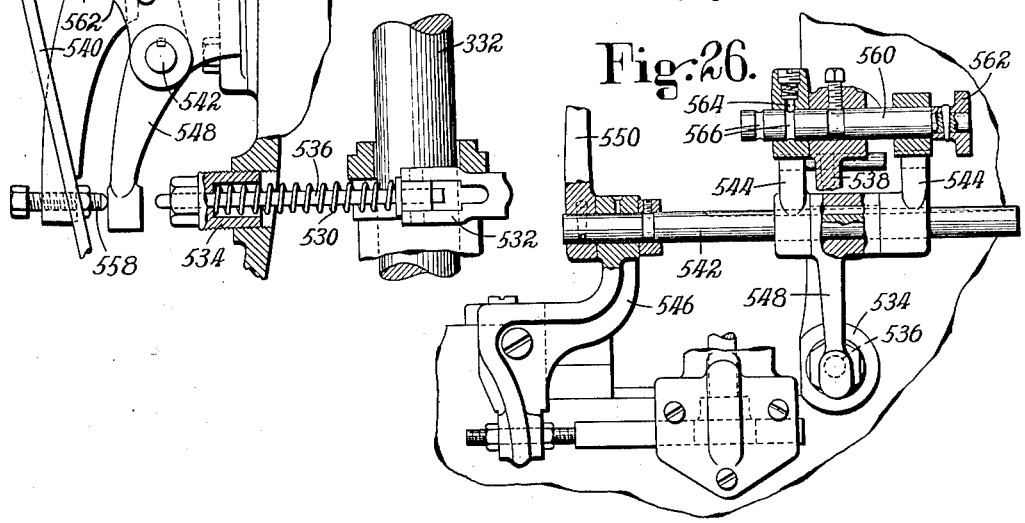

Patented Nov. 6, 1934

1,979,269

UNITED STATES PATENT OFFICE 1,979,269

LASTING MACHINE

Bernhardt Jorgensen, Beverly, Mass., assignor to United Shoe Machinery Corporation, Paterson, N. J., a corporation of New Jersey Application July 29, 1932, Serial No. 625,568

157 Claims. (Cl. 12—12)

This invention relates to machines for use in lasting shoes. The invention is herein illustrated as applied to a machine organization of the same general character as disclosed in Letters Patent No. 1,843,232, granted upon an earlier application of mine on February 2, 1932, such a machine being especially adapted for use in lasting tennis shoes or other shoes in which the uppers are fastened in lasted relation to insoles by adhesion; and objects of the invention are to provide certain improvements in an organization of that character. It is to be understood, however, that the invention is not limited to machines of that particular type nor to machines for operating upon shoes of that particular kind.

In one aspect, the invention aims to improve, under some conditions, the results of the lasting operation in locations at or near the junction of the shank portion and the heel-end portion of a shoe. With this object in view, the invention provides novel means for wiping the sides of the upper heightwise of the last in the vicinity of its heel-end portion, the construction shown comprising upwiping devices arranged to act at the sides of the last where the forward ends of the counter are located. As illustrated, these devices are combined with a heel band that clamps the upper around the heel end of the last and are movably mounted on arms that support the ends of the heel band, the upwiping operation being effected by heightwise movement of the last and shoe, together with the heel band, relatively to the upwiping devices. Among other advantages, this upwiping means assists in avoiding, under some conditions, objectionable results such as might arise from a tendency of the heel band to tip the counter heightwise of the last and thus to displace the forward ends of the counter and other upper materials attached thereto out of their proper relation to the insole.

In accordance with another feature, the invention provides novel means for controlling an end-clamping band, herein shown as the heel band, a particular object being to avoid any possibility of objectionable displacement of the upper around the end of the last by the action of the band thereon as the band is applied to the shoe. It is a characteristic of the organization of the illustrated machine that the ends of the heel band are connected to spring-controlled arms that tend to open the band and are movable inwardly toward the sides of the shoe in response to pressure of the end face of the shoe on the intermediate portion of the band, the band as a whole being movable lengthwise of the shoe to apply it to the shoe. For the purpose in view the construction shown comprises means for adjustably controlling these arms in such manner that the band is substantially centralized laterally with respect to the shoe and has approximately the contour that it is to assume when in clamping position before it is applied to the shoe. As illustrated, the arms are controlled by members that are connected for equalized adjusting movements toward or from each other and serve as limiting stops to determine the normal positions of the arms, the members, however, being yieldable to permit the ends of the band to be wedged farther apart by the shoe if the distance between them should be less than the width of the heel end of the shoe.

Novel means is further provided for controlling the marginal portion of the upper materials (herein frequently referred to inclusively as the upper) to assist in lasting the upper tightly and smoothly over the last and the insole, this means being shown as applied to mechanisms with which the machine is equipped for lasting the opposite side portions of the shoe between its toe and heel end portions. These mechanisms comprise, as heretofore, flexible lasting straps for working the upper heightwise of the last by frictional contact therewith, and members that act through the straps to lay the margin of the upper inwardly over the insole; and for the purpose in view there are provided on these lasting mechanisms devices that clamp the margin of the upper yieldingly against the straps and serve as "retarders," permitting the upper to slip out from between them and the straps before the lasting operation is completed. These devices accordingly assist the straps in conforming the upper materials tightly and smoothly to the sides of the last and also in laying the marginal portion of the materials over the insole without any objectionable wrinkles.

A novel feature of the invention is also to be recognized in improved means for clamping an upper around an end of a last, this means being herein shown as arranged to clamp the upper around the toe end of the last and also to wipe the upper heightwise of the last in the course of the operation of the machine. As illustrated, there is provided a flexible band for engaging the upper around the toe, a plurality of spring fingers arranged to extend heightwise of the last in a series about the toe to control the band, and a coil spring extending around the series of fingers to assist in pressing the band firmly, yet yieldingly, against the upper.

Improved means is further provided for controlling the insole in the lasting operation, and as illustrated also for controlling portions of the margin of the upper, this means being herein shown as arranged to operate at the toe-end portion of the shoe. The construction shown comprises a plurality of members that engage the insole respectively at the end and the sides of the toe to press it close to the last and also to press the margin of the upper against the edges of the inwardly moving wipers, the different members being yieldable heightwise of the last independently of one another in response to wedging action of the wipers thereon to permit the upper to be wiped inwardly between them and the insole. Since the different members are thus independently yieldable, the insole is effectively controlled both at the sides and at the end of the toe until the wipers have begun to wipe the upper inwardly over its edge in those different locations. Provision is also afforded for adjustment widthwise of the shoe of the members that act at the sides of the toe for better accommodation to shoes of different sizes and shapes.

Under some conditions it is desirable to position the forepart of each last and shoe laterally with substantial accuracy, so as to insure that the toe will be substantially centralized relatively to the toe wipers in the lasting operation. For this purpose the machine herein shown is provided with members that are arranged to engage the upper at the opposite sides of the forepart to determine the lateral position of the last and shoe, these members being connected for equalized adjusting movements toward or from each other for positioning shoes of different sizes. As illustrated, the arrangement is such that in the operation of the machine the last and shoe are moved heightwise in a direction to carry them away from the positioning members. Such positioning means, in an organization of the character disclosed, serves especially to insure that the forepart of the shoe will not be displaced laterally by the side-lasting mechanisms when the latter are moved inwardly into contact with the sides of the shoe.

Further to determine accurately the relation of the forepart of the upper to the lasting means, the invention provides novel means that may be utilized to engage the upper in jig holes formed therein. In the construction herein shown this means comprises jig pins arranged to enter jig holes in the margin of the upper at the opposite sides of the forepart and movable laterally of the shoe to withdraw them from the jig holes, means being provided for adjusting the jig pins toward or from each other and also for adjusting them relatively to each other in directions lengthwise of the shoe. The illustrated arrangement is further such that the jig pins are withdrawn from the upper under control of a member that is movable by the operator to start the power operation of the machine.

Still other features of the invention herein illustrated as improvements in the organization disclosed in the previously mentioned Letters Patent comprise improved means for insuring against damage to the machine through interference of the lasting means with mechanism provided for removing the shoe after the lasting operation; improved means for closing end-lasting wipers, herein shown as the heel wipers, laterally of the shoe; means for adjustably controlling a device that is mounted for tipping movements to determine by contact with the shoe bottom the position of end-lasting wipers; novel means for releasing a member or presser foot that engages the bottom of the shoe to permit the shoe to be pressed more firmly against the lasting wipers; means whereby an insole-controlling device engaging the shank portion of the insole may be adjusted laterally of the shoe; means for adjustably varying movement of a member that by contact with the top of the forepart of the upper pulls the upper lengthwise of the last; improved means for adjustably controlling devices that wipe the upper heightwise of the last at its opposite sides; and novel means for preventing, if desired, the starting of the power operation of the machine or the tripping of the clutch by movement of the member normally utilized for that purpose.

The above and other features of the invention, including various novel details of construction and combinations of parts, will now be more particularly described by reference to the accompanying drawings and pointed out in the claims.

In the drawings,

Fig. 7 is a plan view of portions of the heel-lasting mechanism;

Fig. 8 is a plan view on a lower plane of portions of the mechanism shown in Fig. 7;

Fig. 9 is a section on the line IX—IX of Fig. 7;

Fig. 10 is a plan view, with parts broken away, showing a portion of the shoe-supporting means;

Fig. 11 is a section on the line XI—XI of Fig. 10;

Fig. 12 is a section on the line XII—XII of Fig. 8;

Fig. 13 is a vertical section showing parts of the side-lasting mechanisms with the means for controlling the margin of the upper materials;

Fig. 14 shows in elevation portions of the structure shown in Fig. 13 as viewed from the right-hand side of the latter;

Fig. 15 is a plan view of parts shown in Fig. 13;

Fig. 16 is a plan view of the toe-lasting mechanism and parts associated therewith, with portions of the structure broken away;

Fig. 17 is a section on the line XVII—XVII of Fig. 16;

Fig. 18 is a central vertical section through the toe-lasting mechanism on a plane extending lengthwise of the shoe;

Fig. 24 is a plan view, with parts in section, showing means with which the machine may be provided for determining the position of the toe end of the upper;

Fig. 25 shown in left-hand end elevation portions of the structure shown in Fig. 24, with parts broken away;

Fig. 26 is a section on the line XXVI—XXVI of Fig. 24; and

Fig. 27 is a section on the line XXVII—XXVII of Fig. 24.

Since the invention, as previously stated, is herein illustrated as applied to a machine the general organization of which is, for the most part, substantially as disclosed in the above-mentioned Letters Patent, only such parts of the structure as it is necessary to refer to for an understanding of the invention will be described in detail.

Figure 1:
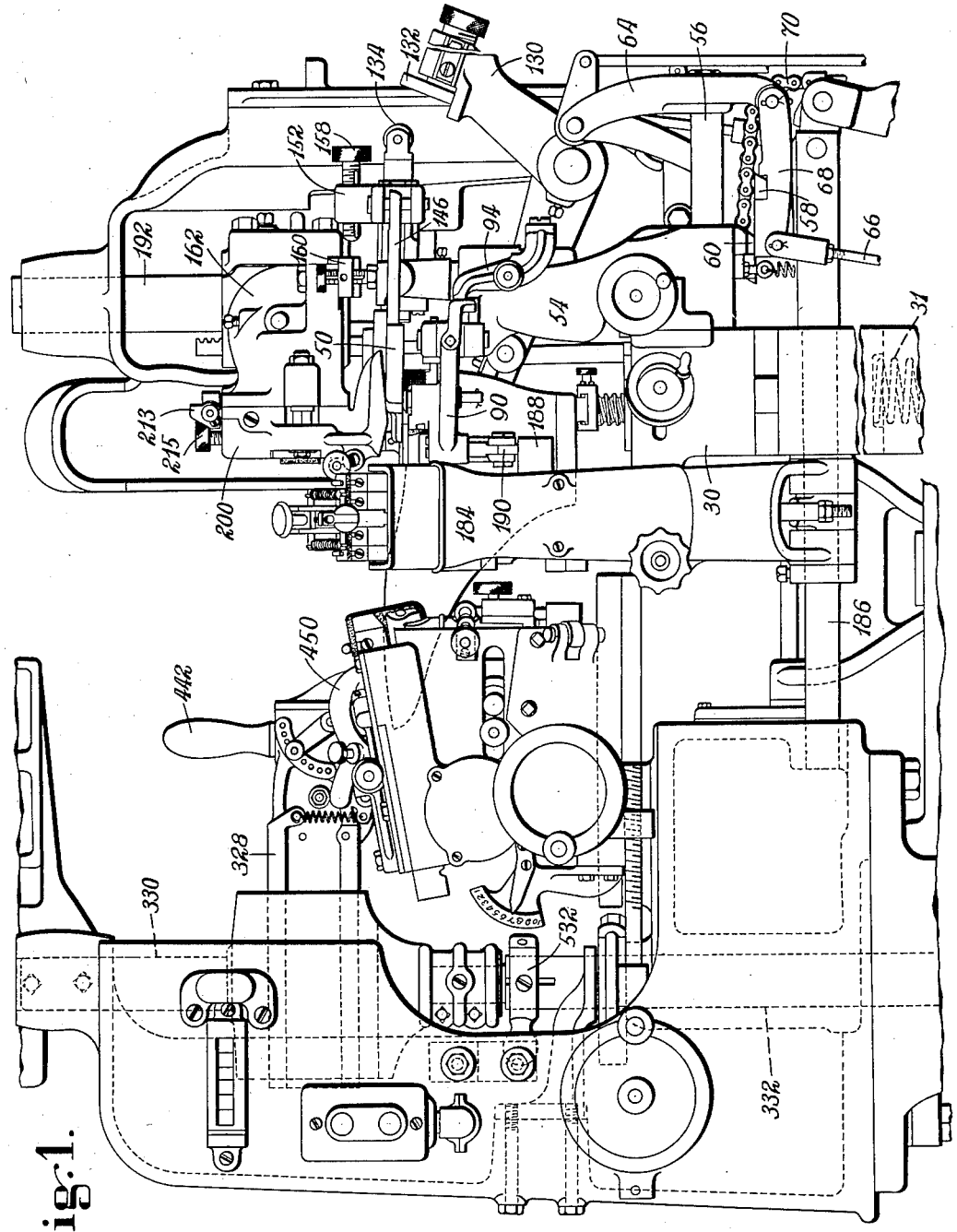
Fig. 1 is a view in front elevation of the upper portion of a machine in which the features of the invention are embodied.

As in the earlier machine, the shoe and last are supported for the lasting operation on a vertically-movable slide 30 (Fig. 3) which is moved downwardly by pressure on the bottom of the shoe at a predetermined time in the operation of the machine against the resistance of a spring 31 (Fig. 1), this slide carrying a last pin 32 arranged to enter the spindle hole in the heel end of the last. The last pin is mounted on a threaded rod 34 adjustable heightwise and lengthwise of the shoe by devices shown in Fig. 10 which need not be described in detail since they are constructed substantially as in the earlier machine. In the construction herein shown, however, the last pin 32 is not fixed in invariable relation to the rod 34, but is adjustable relatively to the rod about an axis extending lengthwise of the shoe and located substantially at the bottom face of the heel and of a shoe made on a last of average height to permit the bottoms of the toe ends of shoes made on lasts of widely different styles to be positioned in proper relation to the plane of the toe-lasting wipers notwithstanding such variations as there may be in the angular relation of the spindle holes to the bottoms of the foreparts of the different lasts. For this purpose the last pin is mounted on a block 36 provided with flanges that extend into guideways 38 (Figs. 10 and 11) formed in upstanding portions of a head 40 on the rod 34, these guideways and flanges being curved about an axis located substantially as above described. It will thus be seen that as the block 36 is moved in one direction or the other laterally of the shoe the last pin 32 is tipped as required without any substantial bodily lateral displacement of portions of the heel end of the shoe near its bottom face. To secure the block 36 in the proper adjusted position suitable for lasts of a given style and for right and left lasts of that style, one of the flanges on the block is provided with a plurality of teeth 42 (Fig. 10) and in the adjacent side of the head 40 there are slidingly mounted pins 44 with tapered ends arranged to project between adjacent teeth 42. The pins 44 are controlled by a plate 46 which bears upon shoulders on the pins and is held normally pressed against the side of the head 40 by a spring 48. It will be understood that either pin may be pulled outward against the resistance of the spring 48 to permit adjustment of the block 36. In Figs. 10 and 11 the block is shown in a central position between the pins, as may be required by certain lasts, provision being afforded for a small amount of movement of the block in one direction or the other before it is stopped by either of the pins.

Figure 3:
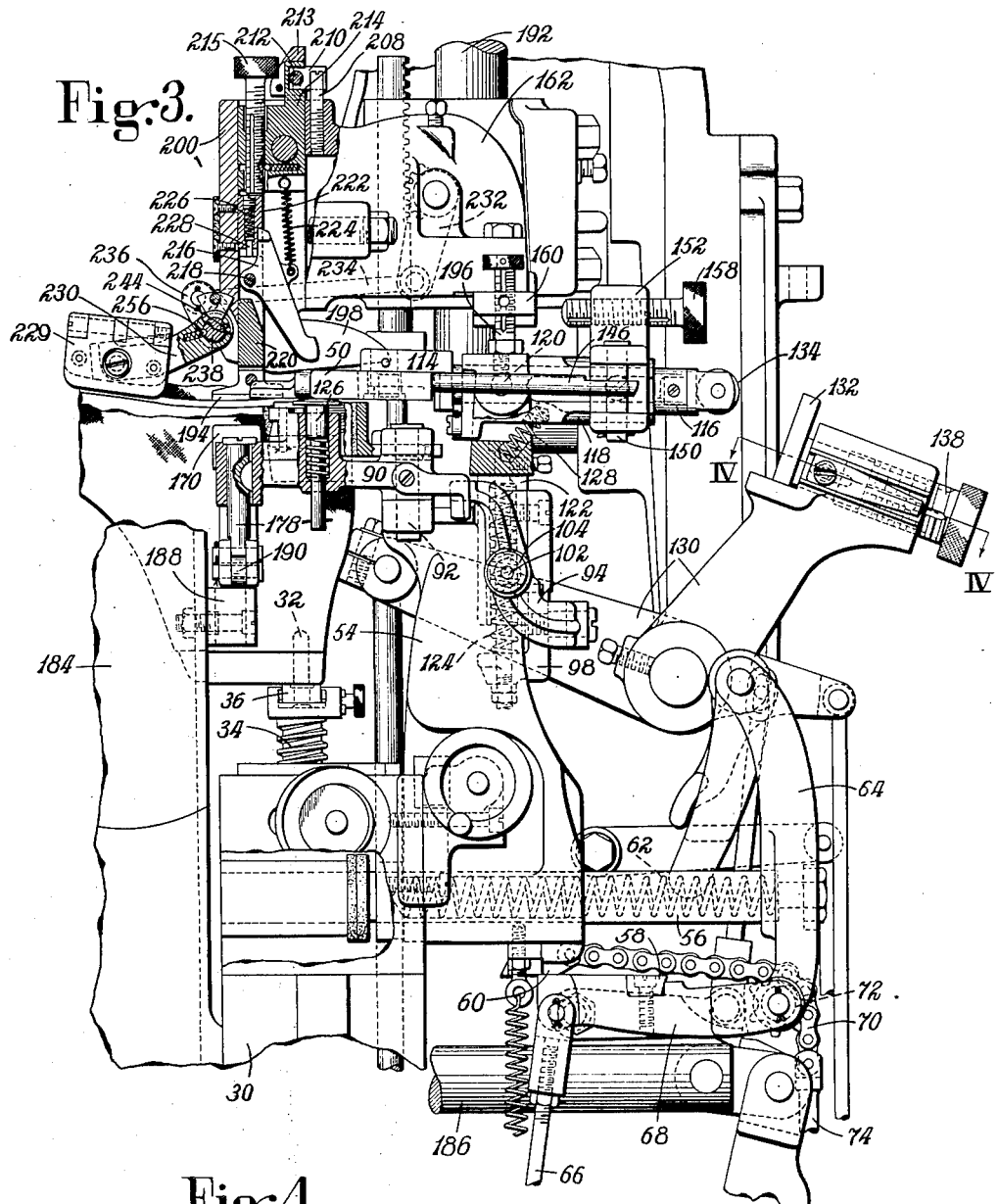
Fig. 3 shows partly in front elevation and partly in section, on an enlarged scale, portions of the machine at the right-hand side of Fig. 1.

For lasting the heel end of the shoe there are provided, substantially as in the earlier machine, a pair of wipers 50 (Fig. 7) and a flexible heel band 52, these parts being carried by a slide 54 which is guided for movements lengthwise of the shoe on a pair of horizontal rods 56, one of which is shown in Fig. 3, projecting from the vertically movable shoe support slide 30. The slide 54 is maintained initially in an idle position comparatively remote from the shoe by a latch 58 in engagement with a lug 60 on the lower end of the slide, and upon its release by the latch it is moved toward the shoe by a spring 62 which abuts at one end against a bracket 64 secured to the outer ends of the rods 56. The latch 58 is moved by the operator to release the slide 54 prior to the starting of the power operation of the machine to cause the clamping of the upper about the heel end of the last by the heel band 52. The mechanism for this purpose includes a rod 66 corresponding to the rod 90 shown in the previously mentioned Letters Patent, this rod, however, in the construction herein shown being connected to a lever 68 pivoted on the bracket 64 and on which the latch member 58 is mounted.

Figure 2:
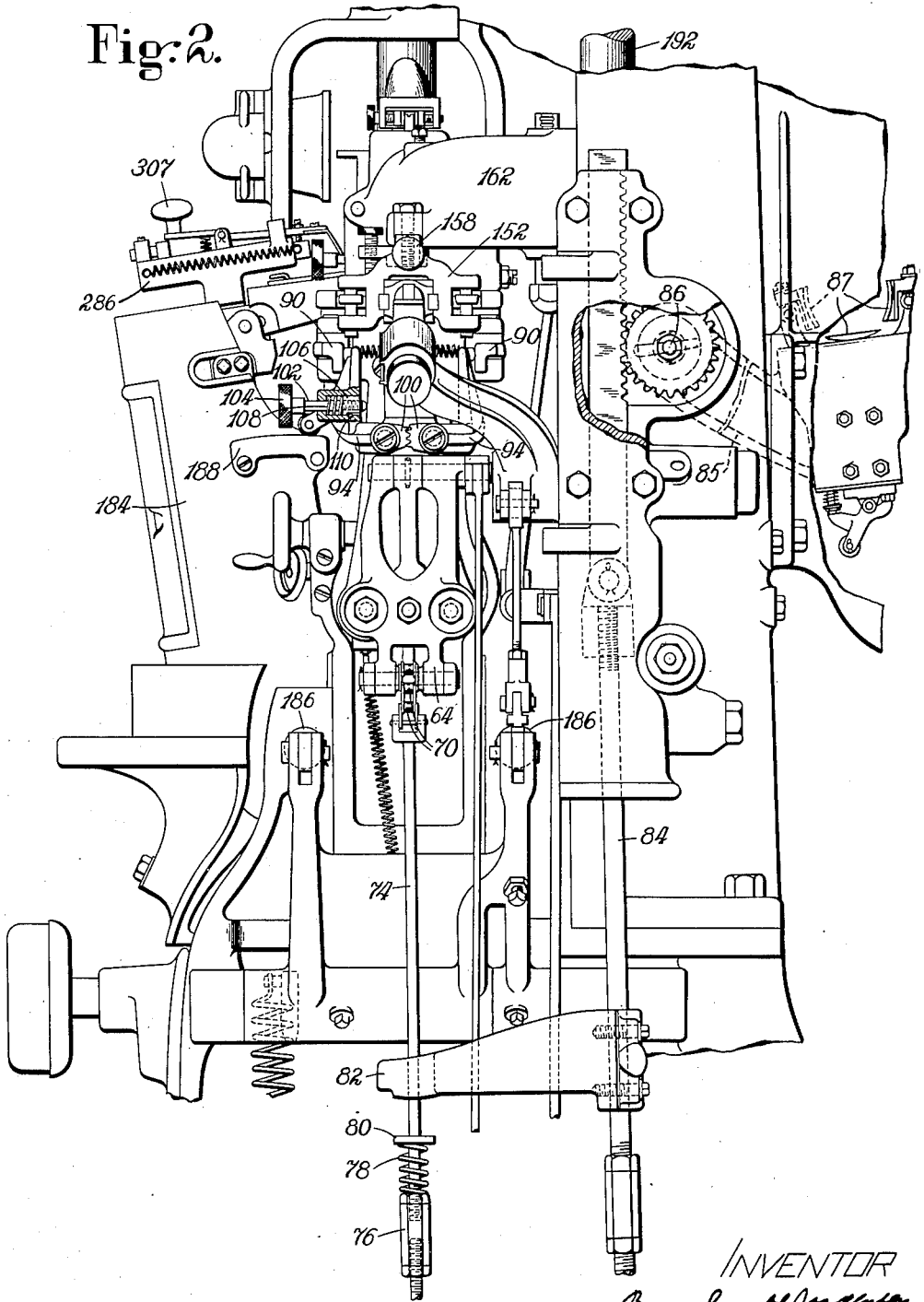
Fig. 2 is a view of the same portion of the machine in right-hand side elevation.

For returning the slide 54 to its initial position where it is held by the latch 58 the machine herein shown has automatic mechanism which acts through a chain 70 connected at one end to the slide and extending over a pulley 72 on the bracket 64. This chain is connected to the upper end of a rod 74 which corresponds to the rod 138 of the above-mentioned Letters Patent and, as in the machine there shown, is arranged to be operated at its lower end by a treadle whereby the slide 54 may be returned to its initial position by the operator in case of its accidental release at any time or in case it should be desired to return it for any other reason prior to the power operation of the machine. In the construction herein shown the rod 74 is in two parts connected by a turnbuckle 76 (Fig. 2) which supports a buffer spring 78, this spring having mounted on its upper end a washer 80 arranged to be engaged by a vertically movable arm 82 through an opening in which the rod 74 extends. The arm 82 is fast on a reciprocatory link 84 which corresponds to the link 864 shown in the previously mentioned Letters Patent and is a part of automatic means with which the machine is provided for removing the shoe from the shoe support after the lasting operations have been completed, this means including an oscillatory shoe-carrying arm 85 having shoe-gripping means 87 thereon and mounted on a rock shaft 86 for swinging movement into position to grip the shoe on the shoe support and for reverse swinging movement to carry the shoe to a position in which it is released. This arm is swung into position to grip the shoe by downward movement of the link 84 at a predetermined time in the automatic operation of the machine, and in the construction herein shown the arm 82 is carried by this movement of the link 84 into position to act yieldingly through the spring 78 on the rod 74 to move the slide 54 away from the shoe into position to be caught and held by the latch 58. By this means insurance is afforded that the heel-lasting mechanism, including the heel band and the wipers, will be withdrawn from the shoe before the shoe-removing mechanism arrives in position to grip the shoe, so as to avoid any possibility of damage to the machine by contact of the shoe-removing mechanism with the lasting mechanism. The mechanism disclosed in the prior Letters Patent for bringing the machine to a stop automatically in case the heel-lasting mechanism should accidentally occupy a position close to the shoe when the shoe-removing mechanism is operated is accordingly dispensed with as unnecessary.

The heel band 52, which comprises a flexible member mounted on a chainlike carrier 88 (Fig. 8), is supported at its forward ends by levers 90 which are fastened between their ends to vertical rock shafts 92 mounted on the slide 54 as in the earlier machine, these levers being connected at their rear ends by a spring 93 which tends to swing their forward ends or arms apart but is yieldable to permit these arms to be drawn inwardly toward the shoe by pressure of the end face of the shoe against the intermediate portion of the band. In the construction herein shown there is provided means for adjustably controlling the levers 90 in such manner that the heel band has approximately the contour that it assumes when clamping the shoe and is also substantially centralized laterally with respect to the heel end of the shoe before it is advanced toward the shoe by the movement of the slide 54, so as to guard against any excessive forward wiping action on the upper at one side or the other with the possible result of displacing the upper. For this purpose there are provided a pair of curved arms 94 which are mounted for swinging movements on horizontal studs 96 mounted on a bracket 98 on the slide 54, these arms being connected together for equalized swinging movements toward or from each other by means of gear sectors 100 (Figs. 2 and 8) thereon and extending into positions to serve as limit stops in engagement with the rear end portions of the levers 90. For controlling and adjusting the arms 94 there is supported on one of them a spindle 102 which is slidably mounted in an opening in the arm and has a knurled head 104 on its outer end, the spindle being threaded in a nut 106 which is slidably mounted in a socket in the arm. Bearing on the nut 106 is a spring 108 which tends to force the nut and the spindle inwardly, the inward movement of the nut being limited, however, by a pin 110 which also prevents the nut from turning. The spindle 102 is arranged to engage at its inner end the adjacent side face of the slide 54 and thus to limit adjustably the distance apart that the band-supporting arms of the levers 90 can be swung by the spring 93 while maintaining these arms at equal distances from a fixed point between them. Preferably the spindle will be so adjusted, in accordance with the size of the shoe, that the ends of the heel band will be close to the sides of the shoe as the band is carried by the slide 54 into shoe-engaging position. In case the ends of the band should be so adjusted that the distance between them is less than the width of the heel end of the shoe, the spring 108 will yield to permit the ends of the band and their supporting arms to be swung farther apart by the wedging action of the shoe thereon. On the other hand, the construction described permits the band-supporting arms of the levers 90 to be swung farther toward each other by pressure of the shoe on the intermediate portion of the band if the ends of the band are spaced, as usual, somewhat farther apart than the width of the heel end of the shoe.

Figure 4:
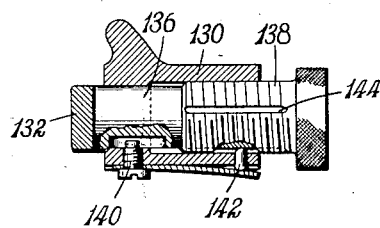
Fig. 4 is a section on the line IV—IV of Fig. 3.

The heel-lasting wipers 50, as in the machine shown in the prior Letters Patent, are mounted for swinging movements on a vertical pin 112 (Fig. 7) carried by the head 114 of a hollow plunger 116 which serves as a wiper carrier and is mounted for lengthwise movements and for turning movements in a holder 118. The holder 118 is mounted by means of trunnions 120 on the forked upper end of a plunger 122 (Fig. 3) which is movable vertically in a recess in the slide 54 and is depressible against the resistance of a spring 124. Further yielding support for the wipers is provided by spring-controlled plungers 126 mounted in the levers 90 that carry the heel band. In the construction herein shown there is further provided a spring 128 (Fig. 3) which by its tendency to swing the holder 118 in one direction maintains the wipers 50 at all times in contact with the plungers 126. The wipers are advanced lengthwise of the shoe by forward movement of the plunger 116 effected, as in the earlier machine, by the operation of a bell-crank lever 130 which in the construction herein shown is provided with a plate 132 arranged to engage a roll 134 on the end of the plunger 116. The plate 132 has a stem 136 (Fig. 4) slidingly mounted in a bearing in the lever 130 and engaged by a screw 138 by which the plate 132 may be adjusted to vary the amount of movement lengthwise of the shoe imparted to the wipers by the operation of the lever. The stem 136 has a slot therein to receive a stud on the end of a screw 140 which prevents accidental removal of the plate 132 from the lever 130 while permitting the necessary adjustment, and to prevent accidental turning of the adjusting screw 138 there is provided a spring-pressed pin 142 with a rounded end arranged to enter one or another of a plurality of slots 144 in the screw.

As the wipers 50 are advanced lengthwise of the shoe by movement of the plunger 116 they are closed laterally of the shoe about the pin 112 by the action of links 146 (Fig. 7) connected to crossed arms 148 that project from the wipers as in the earlier machine. In the construction herein shown the links 146 are pivotally connected at their outer ends to pins 150 carried by a yoke 152 which is supported by the holder 118 and is guided for movements along the holder in directions lengthwise of the shoe, the guiding means comprising bars 154 (Fig. 9) fastened by screws 156 to the yoke and running in slots formed in the holder 118. The ends of the screws 156 project into slots 157 in the holder 118 to limit movement of the yoke 152 relatively to the holder. The yoke 152 carries a screw 158 the end of which is arranged to engage a bracket 160 (Fig. 3) which is fastened to a carrier 162 hereinafter referred to as provided with means for depressing the heel wipers and the shoe in the operation of the machine, and it will be understood that on engagement of the screw with the bracket movement of the yoke 152 is stopped while the movement of the plunger 116 continues. This results in the closing of the wipers laterally of the shoe through the action of the links 146. By adjustment of the screw 158 the amount of closing movement thus imparted to the wipers may be varied. Since it is the member 162, supported independently of the slide 54, that resists the forward movements of the links 146 to effect the closing of the wipers, there is no increase, in this operation, in the pressure of the heel band on the shoe such as might tend to tip the shoe and unduly depress its forepart relatively to the toe wipers. As in the earlier machine, the forward movement of the plunger 116 is effected against the resistance of a spring 164 (Fig. 7) which acts to return the plunger and the wipers to their initial positions after they have operated on a shoe.

In order to improve conditions at or near the junction of the shank portion and the heel-end portion of the shoe in operating upon some kinds of shoes, and especially to assist in avoiding any objectionable wrinkling of the upper in locations between the forward ends of the heel band 52 and the portions of the upper that are operated upon by the side-lasting mechanisms, the machine herein shown is provided with means for wiping upwardly toward the edge of the insole portions of the upper where the forward ends of the counter are located. For this purpose the heel band is somewhat shortened, as compared with the earlier construction, and upwiping devices are mounted on the forward ends of the levers 90 adjacent to the ends of the heel band, as illustrated in Figs. 3, 8 and 12. Each of these upwiping devices comprises a carrier 166 having an upwardly extending portion provided with a socket to receive a stem 168 extending downwardly from a block 170 on which is fastened a pad 172 for engagement with the upper. The stem 168, while mounted to turn in the socket in the carrier 166 to permit the block 170 to adjust itself to the shoe, is held against upward movement relatively to the carrier by a pin 174 which extends into a slot in the stem. The carrier 166 is pivoted at 176 to a vertical rod 178 slidingly mounted in an opening in the lever 90, the rod having a screw 180 threaded in its upper end the head of which is arranged to engage the lever 90 to limit downward movement of the carrier 166. A spring-pressed plunger 182 in the lever 90 tends to force the carrier downwardly and also to tip it about the pivot 176, its tipping movement being limited, when there is no shoe in the machine, by engagement with a shoulder 183 on the rod 178. By reference to Figs. 3 and 12 it will be seen that initially, after the pads 172 have been applied to the shoe by the movements of the levers 90 in closing the heel band about the shoe, each upwiping device engages the shoe at a substantial distance below the edge of the insole, and to effect the upwiping operation each carrier 166 is held against downward movement when the shoe and its support, together with the slide 54 that carries the heel band and the wipers, are forced downwardly to cause an upwiping of the upper by the side-lasting mechanisms operating at the sides of the shank portion of the shoe in the manner disclosed in the previously mentioned Letters Patent. Each of these side-lasting mechanisms includes a casing 184 (Fig. 1) mounted for swinging movements laterally of the shoe about the axis of a horizontal rod 186 that supports the casing; and as herein shown there is fastened on the side of each casing an abutment 188 arranged to engage a roll 190 on the adjacent carrier 166 to hold the carrier against downward movement when the levers 90 are moved downward with the shoe. By the upwiping operation thus effected portions of the upper where the forward ends of the counter are located are drawn tightly upward to counteract any tendency that there may be under some conditions for the heel band to tip the counter and thus to depress its forward ends together with other portions of the upper materials that may be attached thereto. Insurance is thus afforded against any objectionable wrinkling of the upper immediately at the rear of the portions that are wiped upwardly by the side-lasting mechanisms.

Figure 5:
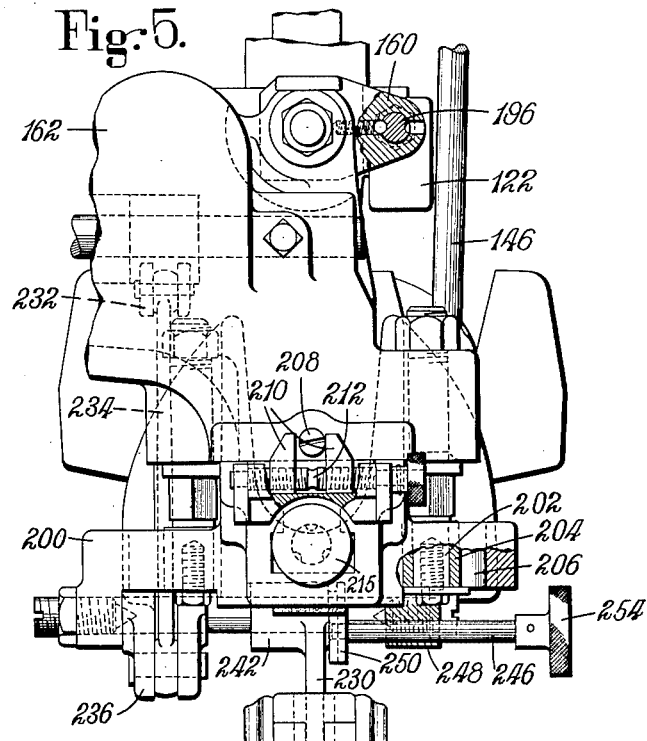
Fig. 5 is a plan view of portions of the structure shown near the right-hand side of Fig. 1, with parts broken away.
Figure 6:
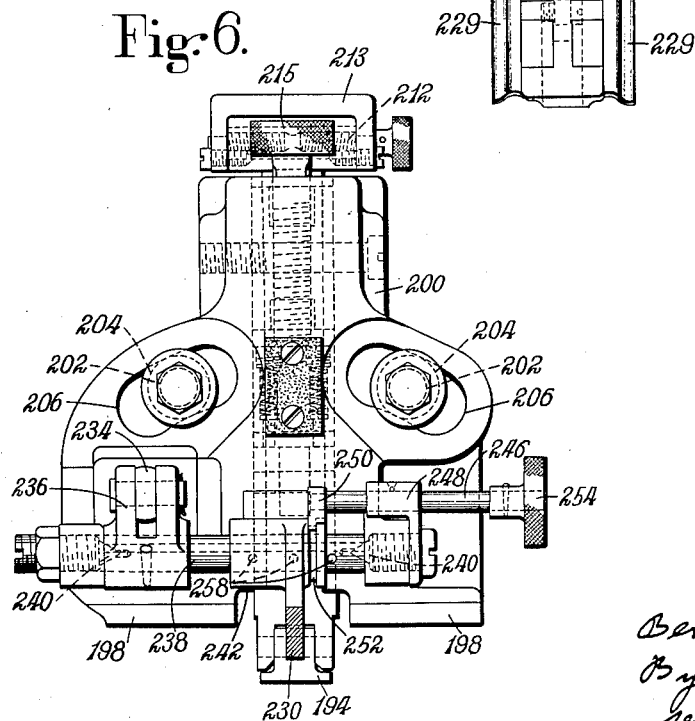
Fig. 6 is a view, partly in left-hand end elevation and partly in section, of a portion of the structure shown in plan in Fig. 5.

The previously mentioned carrier 162 is fast on a vertical rod 192 (Figs. 1 and 3) mounted for turning movements and also for up and down movements in bearings in the frame, as in the machine shown in the previously mentioned Letters Patent. Supported on the carrier 162 by means hereinafter described is a presser foot 194 arranged to engage the bottom of the heel end of the shoe, the presser foot being moved to a position over the shoe bottom by swinging movement of the carrier 162 about the axis of the rod 192. Thereafter the carrier 162 is moved downwardly to assist in depressing the shoe and its supporting slide 30, together with the heel band and the wipers, against the resistance of the previously-mentioned spring 31 which controls the slide 30. The heel wipers are positioned initially by the spring-controlled plungers 122 and 126 in a higher plane than their operating plane, and as the carrier 162 is moved downwardly to carry the presser foot 194 into engagement with the shoe before depressing the shoe, the carrier acts to depress the wipers to a position determined by engagement of the presser foot with the heel end of the insole. For this purpose the carrier is provided with a screw 196 arranged to engage the top of the forked upper end of the plunger 122 and with arms 198 (Figs. 3 and 6) arranged to engage the different wipers 50 over the plungers 126. The arms 198 are further arranged to position the wipers, as determined by the shoe, with respect to tipping movements about the axis of the plunger 116. For this purpose these arms are parts of a block 200 on which the presser foot 194 is supported, this block being so mounted on the carrier 162 as to permit it to rock or tip laterally of the shoe. Provision for such rocking movement is afforded by studs 202 (Fig. 6) on which are mounted rolls 204 which lie in curved slots 206 in the block 200 and on which the block is supported. The block 200, therefore, is rocked to a position determined by engagement of the bottom face of the heel end of each shoe with the flat lower face of the presser foot 194, so that the wipers 50 are adjusted to whatever lateral slope there may be on the heel end of the shoe bottom. To facilitate this operation there is provided, in the construction herein shown, means for adjustably limiting the rocking movements of the block 200 in opposite directions, so that initially the block will not be too far displaced from the position that it should assume upon contact of the presser foot 194 with the shoe. This means comprises a stop screw 208 (Figs. 3 and 5) mounted on the carrier 162 and positioned between two fingers 210 which by means of right and left hand screw threads formed on a spindle 212 swiveled in lugs on a member 213 that is fast on a block 214 mounted in the block 200 are adjustable in unison toward or from each other. By turning the spindle 212 the fingers 210 can accordingly be set to determine symmetrically by their engagement with the stop screw 208 the proper limits of rocking movements of the block 200 for right and left shoes made on lasts of any given style.

As above explained, the presser foot 194 by its engagement with the shoe determines the height of the wipers 50 relatively to the bottom of the shoe, and this relation between the shoe and the wipers can be varied by adjustment of a screw 215 (Fig. 3) which is threaded in the block 214. Between this screw and the presser foot, in the construction herein shown, there is provided mechanism which is operated at a predetermined time in the cycle of the machine to release the presser foot for upward movement so that the spring 31 which controls the shoe support slide 30 can force the shoe upwardly against the wipers 50 and increase the pressure of the wipers on the overwiped margin of the upper. This mechanism comprises a latch 216 pivoted at 218 on a slide 220 which is vertically movable in a guideway in the block 200 and on the lower end of which the presser foot 194 is pivotally mounted, the latch being arranged normally to engage a downwardly facing shoulder formed on another slide 222 in vertical alinement with the slide 220 and against the upper end of which the adjusting screw 215 bears. A spring 224 tends to maintain the latch 216 in the normal position illustrated in Fig. 3, and with the latch in this position the presser foot is held positively by the screw 215 against upward movement relatively to the block 200. Near the end of the operative movement of the wipers 50 in wiping the margin of the upper over the insole the forward end of the head 114 of the plunger 116 engages the lower end of the latch 216 and swings the upper end of the latch out of engagement with the slide 222. This serves to release the slide 220, so that the presser foot is no longer held positively down by the screw 215, and permits the shoe to be pressed more firmly up against the wipers as described. In the return of the parts to starting positions the slide 220 is moved downward relatively to the slide 222 until the upper end of the latch 216 is again swung by the spring 224 into position under the shoulder on the slide 222. To insure such return of the latch there is mounted in the slide 222 a spring 226 which acts through a pin 228 in engagement with the slide 220 to separate this slide and the slide 222 sufficiently for the purpose in view, the pin 228 having a head on its upper end that limits its downward movement. It will be evident that the spring 224, with the parts in normal relation to one another, serves to pull the slide 220 as far upwardly as permitted by the screw 215, and by adjustment of the latter the position of the slide 220 and of the presser foot may be varied.

In general similarity to the disclosure of the previously mentioned Letters Patent, the machine is further provided with means for pressing the insole close to the bottom of the last at the opposite sides of the shank portion as the opposite side lasting mechanisms begin to lay the margin of the upper inwardly over the insole, this means comprising insole-engaging members 229 (Figs. 3 and 5) carried by an arm 230 which is supported for upward and downward swinging movements on the block 200 which carries the heel presser foot 194. The swinging movements of the arm 230 to carry the members 229 into and out of engagement with the insole are effected through a crank arm 232 connected by a link 234 to another crank arm 236 which is connected to the arm 230. In the construction herein shown the arm 236 is fast on a rock shaft 238 (Fig. 6) supported at its ends by conical pivots 240, and the arm 230 which carries the members 229 is adjustable along this rock shaft to position the members 229 in better relation to the bottoms of shoes made on lasts of different styles. To this end the hub portion 242 of the arm 230 is slidably mounted on the shaft 238, but is connected to the shaft by a key 244 (Fig. 3) so as to turn with the shaft, and for sliding the hub along the shaft there is provided a rod 246 slidingly mounted in a member 248 on the block 200 and carrying at its inner end a member 250 which projects into a groove 252 formed in the hub 242. On the outer end of the rod 246 is a head 254 for moving it. There is further provided means for maintaining the arm 230 in any one of three adjusted positions, comprising a spring-pressed ball 256 (Fig. 3) arranged to enter any one of three recesses 258 (Fig. 6) formed in the shaft 238.

As described in detail in the previously mentioned Letters Patent, each of the opposite side-lasting mechanisms, as shown in Figs. 13 and 14, comprises a plurality of flexible lasting straps 260 connected at their upper ends to lasting figures 262 which are mounted on the upper end of an arm 264 in the casing 184, the arm 264 being mounted at its lower end for swinging movements laterally of the shoe on the same rod 186 (Fig. 1) that supports the casing 184. At their lower ends the straps 260 are connected to blocks 266 pivotally mounted on yieldingly controlled arms 268 which are supported on the casing 184. Prior to the starting of the power operation of the machine the two opposite casings 184 are released by the operator to the action of a spring 270 which swings them toward each other to clamp the upper at the sides of the last in locations along the shank portion of the shoe by the straps 260 and the blocks 266, as illustrated in Fig. 13. Thereafter, in the power operation of the machine, the shoe is depressed as hereinbefore described to effect an upwiping of the upper by the straps 260, and then by swinging movements of the arms 264 the fingers 262, which are yieldingly controlled by these arms, are forced inwardly toward each other and act through the straps 260 to lay the marginal portion of the upper over the insole, the fingers moving relatively to the straps by reason of spring connections 271 between the fingers and the straps. Thereafter, by the action of devices 272, the fingers 262 are rocked to press the margin of the upper more firmly down upon the insole, all as described in detail in the prior Letters Patent. After the side-lasting devices have thus operated upon the shoe in locations adjacent to the heel-end portion of the shoe, they are moved forwardly and operate a second time upon the shoe in locations adjacent to the means that lasts the forepart of the shoe.

For better control of the upper at the sides of the shoe in operating upon some kinds of shoes, and especially in operating upon shoes that include a lining as one of a plurality of layers of upper materials, each of the opposite side-lasting mechanisms, in the machine herein shown, is provided with means for clamping the marginal portion of the upper materials against the straps 260, as illustrated in Fig. 13. The means thus associated with each of the side-lasting mechanisms comprises a flexible resilient clamping plate 274 provided with a plurality of fingers 276 for engaging the upper materials at the inner side of the latter, the plate being fast on a bar 278 which is pivoted at 280 on the forked upper end of a member 282 the lower end of which is threaded in a supporting rod 284. The rod 284 is slidingly mounted for movements laterally of the shoe in a socket formed in an upward extension 286 of a member 288 which is fast on the arm 264 and supports the lasting fingers 262. Springs 290 (Figs. 14 and 15) connected to a pin 292 in the rod 284 and also to a pin 294 in the extension 286 tend to pull the rod 284 outwardly and thus assist in maintaining the fingers 276 yieldingly in clamping engagement with the upper materials, as illustrated in Fig. 13. Further to assist in holding the fingers in clamping position there is provided a spring 296 the lower end of which is seated in a recess in the rod 284 and the upper end in a recess in the bar 278, the spring thus acting to swing the inner end of this bar and the clamping fingers downwardly. The limit of such swinging movement of the bar 278 is adjustably determined by a screw 298 which is threaded in the bar and at its lower end engages the rod 284. In its swinging movements the bar 278 is guided by lugs 300 on the extension 286, and the latter is provided with a slot 302 through which the member 282 and the spring 296 extend. When the parts are in the positions illustrated in Fig. 13 the outer end of the bar 278 is over a block 304 adjustably secured to a member 306 which is held by the pin 294 on the outer end of the extension 286.

It will be understood that when the shoe is first mounted in the machine the marginal portions of the upper materials at the opposite sides of the shoe extend upwardly between the opposite sets of fingers 276, the fingers being at this time in engagement with the straps 260, and this relation is maintained until after the opposite side-lasting mechanisms have received their preliminary inward movements into clamping relation to the upper prior to the starting of the power operation of the machine. By the use of knobs 307 on the outer ends of the bars 278 the operator then slides these bars and the rods 284 inwardly against the resistance of the springs 290, at the same time swinging the bars to lift the fingers 276, until the fingers are positioned at the inner sides of the upwardly projecting marginal portions of the upper materials. The operator then permits the springs 296 and 290 to swing the fingers downwardly and to move them outwardly until they are in positions to clamp the upper materials against the straps 260, as illustrated in Fig. 13. The outer ends of the bars 278 are then over the blocks 304 which insure that the fingers will be held downward in proper clamping positions. When the last and shoe are depressed to cause the straps 260 to wipe the upper upwardly, the fingers 276 by their frictional contact with the marginal portion of the upper materials assist in conforming the materials tightly and smoothly to the sides of the last. Thereafter, as the arms 264 are swung inwardly to cause the lasting fingers 262 to lay the margin of the upper over the insole as hereinbefore described, the clamping fingers 276 are carried inwardly with the arms while still controlling the margin of the upper materials, permitting the latter, however, to slip out from between the fingers and the straps as the overlaying operation progresses. Insurance is thus afforded that the margin of the upper materials will be laid smoothly over the insole. When the side-lasting mechanisms perform their second operation on the shoe near the forepart-lasting means the fingers 276 remain idle since their use to control the materials at that time is unnecessary.

For wiping the margin of the upper inwardly over the insole around the toe the machine herein shown is provided with toe-embracing wipers constructed and operated substantially as in the earlier machine, the wipers comprising a pair of end wiper plates 308 (Figs. 16 and 18) and a pair of side wiper plates 309 which operate at the ends of the plates 308. The plates 308 are pivoted on a stud 310 for swinging movements laterally of the shoe, the stud being mounted on a slide 312 by which the plates 308 are advanced lengthwise of the shoe. The side plates 309, on the other hand, are mounted only for swinging movements laterally of the shoe. Operative movements are imparted to the several toe wiper plates by a rock shaft 314 which in the construction shown is connected to the slide 312 through a gear sector 316 in engagement with teeth on a rack bar 318 which is fast on the slide. Movements laterally of the shoe are imparted to the plates 308 and 309 by rack bars 320 operated by the rock shaft 314. The connections between the rack bars 320 and the different wiper plates need not be described in detail, since they are substantially as disclosed in the previously mentioned Letters Patent, except that the members 322, corresponding to the members 316 of the previously mentioned Letters Patent, are connected to the rack bars 320 by links 324 instead of by gear and rack teeth as in the earlier construction.

Figure 21:
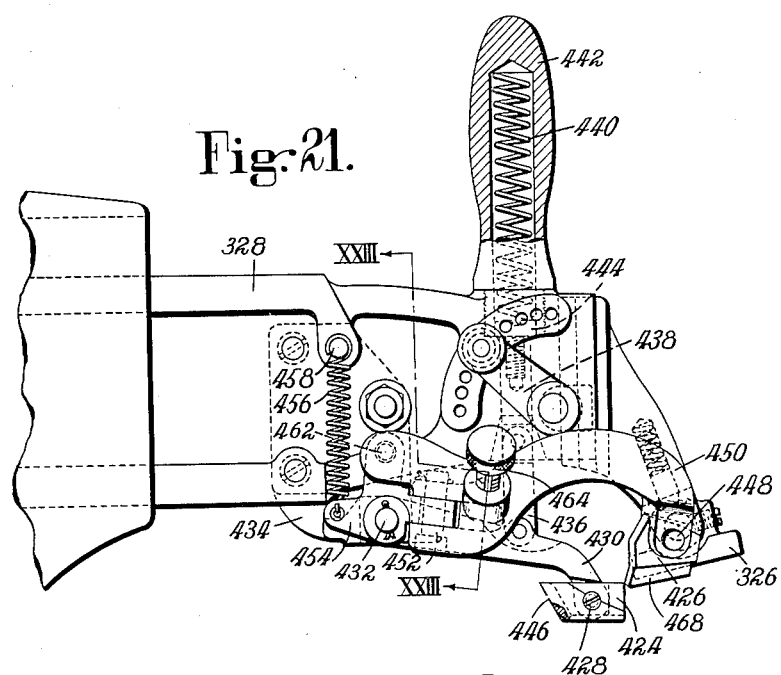
Fig. 21 is a view in front elevation, with parts in section, of means operating at the toe end of the shoe to depress the shoe and to control the insole and upper.
Figure 22:
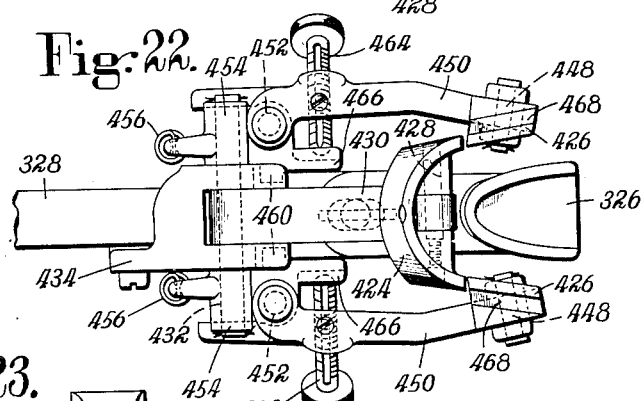
Fig. 22 is an inverted plan view of portions of the structure shown in Fig. 21.

Mention has previously been made of depression of the shoe and its support at a predetermined time in the operation of the machine by the action of the presser foot 194 on the heel end of the shoe bottom. To cooperate with the heel presser foot in depressing the shoe there is provided, as in the earlier machine, a toe presser foot 326 (Figs. 21 and 22) carried by an arm 328 supported by alined posts 330 and 332 (Fig. 1) which are mounted for vertical movements and for turning movements in bearings in the frame of the machine. As the shoe is thus depressed its toe end bears upon a toe rest 334 (Fig. 18) mounted on the upper end of a hollow plunger 336 which is slidingly mounted in a holder 338 and is depressible by the shoe against the resistance of a spring 340. The holder 338 is pivoted at 342 for swinging movement lengthwise of the shoe against the resistance of a spring-controlled plunger 344 to cause the toe rest 334 by frictional engagement with the upper at the top of the forepart to give the upper a forward pull. To effect this result the plunger 336 carries a roll 346 which is engaged by a cam face 348 on a fixed member 350 to swing the holder 338 and the toe rest as the plunger 336 is depressed by the shoe. These parts are all substantially as in the earlier machine. In the present construction there is further provided means for varying the amount of upper-pulling movement thus imparted to the toe rest 334, comprising a screw 352 threaded in the member 350 with its inner end in position to engage the roll 346. By turning the screw 352 the initial position of the toe rest with respect to swinging movement may be varied, with a resulting variation in the amount of swinging movement that is imparted to it by the cam face 348 in the operation of the machine.

Figure 19:
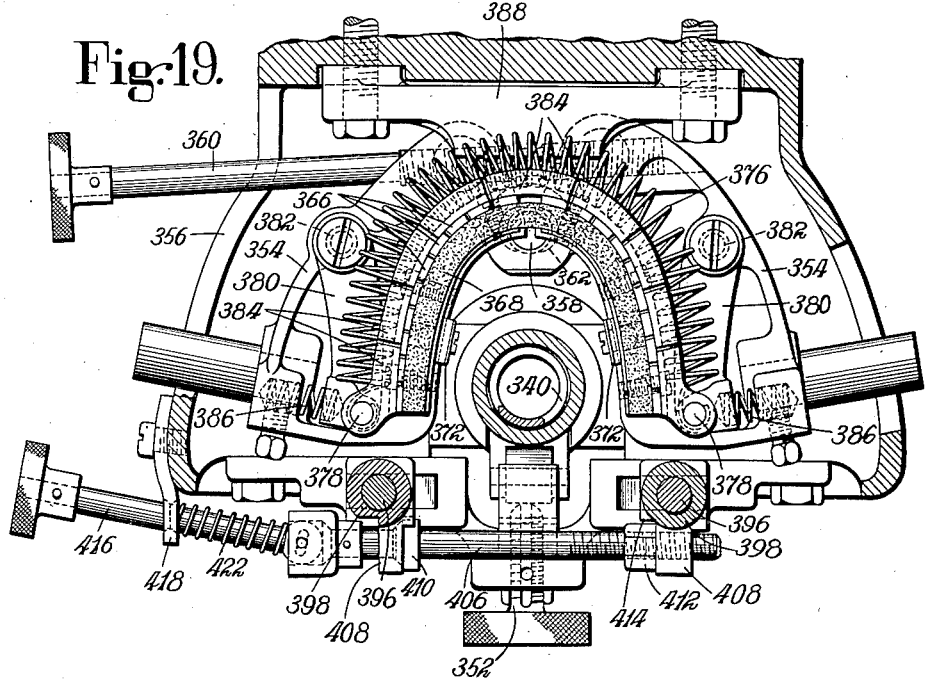
Fig. 19 is a plan view, with parts in section, showing portions of the toe-lasting mechanism on a lower plane than in Fig. 16.

As the shoe is depressed in the manner described the upper is engaged around the toe by means that wipes it upwardly prior to the action of the wipers 308 and 309 thereon and thereafter clamps it against the last, this upwiping and clamping means differing somewhat in construction from that provided in the earlier machine. As in the earlier construction, there are two holders 354 (Figs. 18 and 19) supported on a casing 356 that also supports the toe wipers and pivotally connected together by a stud 358 about which they may be swung toward and from each other for shoes of different widths, such adjustment of the holders being effected by a threaded spindle 360 connected to both of them. The lower end of the stud 358 is mounted in a slot 362 (Fig. 19) in the casing 356 which permits limited bodily movement of both holders 354 laterally of a shoe to conform to the position of the toe of the shoe. In the construction herein shown there is fastened to each holder 354 an upwardly extending plate 364 (Fig. 18) of resilient metal having vertical slots extending nearly to the lower edge thereof to provide a plurality of spring fingers 366 extending heightwise of the shoe in a series about the toe, each plate being curved in approximate conformity to the curvature of a shoe at one side of the toe. Engaging the fingers 366 at their inner sides is a flexible leather toe band 368 shaped to conform approximately to the contour of the toe of the shoe and arranged to engage the upper to effect the upwiping operation, this band being continuous all around the toe. Fastened to the toe band 368 on its inner side, below the portion of the band that engages the shoe, are metal plates 370 engaged by spring clips 372 which are fastened at their lower ends to the holders 354 and at their upper ends have offset portions that enter recesses 374 in the plates 370 to render the clips effective to hold the toe band in place. To reinforce the spring fingers 366 and thereby to cause the toe band to apply more effective upwiping and clamping pressure to the upper there is provided a coil spring 376 which extends horizontally around the series of fingers 366 at their outer sides and is connected at its ends to pins 378 that extend upwardly from arms 380 pivoted at 382 on the holders 354. Between the spring 376 and the fingers 366 are mounted a series of curved blocks 384 provided with recesses in which the spring is seated and by reason of which the blocks are supported by the spring. The end blocks 384 of the series are pivotally mounted on the pins 378 to which the ends of the spring 376 are connected. The arms 380 are backed up by springs 386 which tend to swing them inwardly toward the shoe, their inward movements, however, being limited by the fingers 366. As the toe end of the shoe is forced downwardly, therefore, the toe band 368 is pressed yieldingly against the upper by the spring fingers 366 and the reinforcing spring 376, as well as by the springs 386 which act on the arms 380 near the ends of the band, the band being yieldable against the resistances of these different springs to adjust itself better to the contour of the toe. To prevent excessive yield of the band at the end of the toe the central block 384 of the series is provided with a downward extension (Fig. 18) arranged to engage an abutment 388 which is fast on the casing 356.

Figure 20:
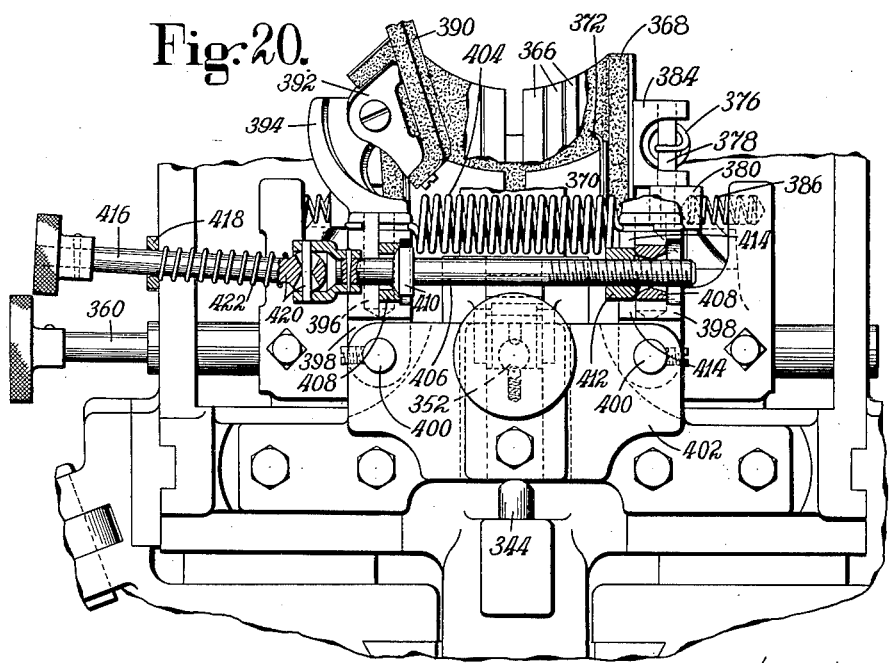
Fig. 20 shows in elevation portions of the structure shown in Fig. 19, with parts broken away.

For lasting the sides of the shoe in locations at the forward ends of the toe-lasting wipers there are provided, as in the earlier machine, flexible lasting straps 390 (Figs. 16, 18 and 20) yieldingly connected at their upper ends to the side wiper plates 309 and connected at their lower ends to blocks 392, one of which is shown in Fig. 20, these blocks being pivotally mounted on the upper ends of carriers 394 provided with depending shank portions 396 which are swiveled in arms 398 for movements about axes extending heightwise of the shoe to permit the blocks 392 to adjust themselves to the lengthwise contour of the shoe. The arms 398 are pivoted at 400 on a fixed bracket 402 for swinging movements laterally of the shoe and are pulled toward each other by a spring 404. Portions of the straps 390 that are engaged by the blocks 392 are thus arranged to wipe the upper upwardly toward the edge of the insole simultaneously with the upwiping action of the toe band 368 as the shoe is depressed, the arms 398 being spread apart more or less against the resistance of the spring 404 by the wedging action of the shoe thereon. In the construction herein shown there is provided means for adjusting the arms 398 toward or from each other which is so constructed as to permit both arms to be moved in unison in the same direction by the action of the shoe on one or the other of the blocks 392 for better insurance that the opposite lasting devices will act effectively on both sides of each shoe regardless of its shape. This adjusting means comprises a spindle 406 extending loosely through openings provided in lugs 408 on the arms 398 and having fast thereon a collar 410 which engages the inner face of the lug on the left hand arm (Fig. 20). Threaded on the spindle is a nut 412 engaging the inner face of the lug on the right hand arm. The collar 410 and the nut 412 thus determine adjustably the distance between the arms 398, and by turning the spindle relatively to the nut this distance may be varied, the nut being arranged to engage a face 414 on the adjacent arm to prevent it from turning. For thus turning the spindle 406 there is provided a spindle 416 supported in an opening in a bracket 418 on the casing 356 and connected to the spindle 406 by a universal joint 420. To insure that the nut 412 will always be under control of the face 414 which prevents it from turning, there is mounted on the spindle 416 a comparatively light spring 422 bearing at its outer end on the bracket 418 and tending to move the spindle 406 toward the right (Fig. 20) so as to keep the nut 412 in contact with the right hand lug 408. It will be evident that the spindle 406 and the parts connected thereto do not interfere with such swinging movement of both arms 398 toward the left or right as may result from an excess of pressure on one or the other of the blocks 392 as the shoe is forced downwardly.

Figure 23:
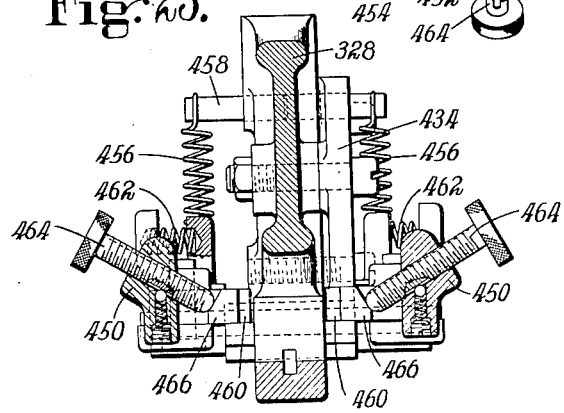
Fig. 23 is a section on the line XXIII—XXIII of Fig. 21.

To insure that the margin of the insole around the toe will be close to the bottom of the last in the toe-lasting operation, and also to assist the toe wipers in wiping the margin of the upper tightly and smoothly inward over the insole, the machine herein shown is provided with mechanism on the arm 328 (Figs. 21, 22 and 23) which differs somewhat from the mechanism disclosed in the previously mentioned Letters Patent. The construction herein shown comprises an insole-engaging member 424 curved to extend around the end of the toe and other members 426 for engaging the insole at the sides of the toe. The member 424 is pivoted for movement about an axis extending laterally of the shoe on a stud 428 carried by an arm 430, the member 424 thus being permitted to adjust itself to the lengthwise contour of the shoe bottom. The arm 430 is not movable lengthwise of the shoe as in the earlier construction, but is movable only heightwise of the shoe about a horizontal rod 432 supported by a bracket 434 that is fast on the arm 328. The arm 430 is further connected by a link 436 to a plunger 438 which is movable upwardly in the arm 328 against the resistance of a spring 440 mounted in a handle 442 on the arm. Downward movement of the plunger 438 is limited by the head of a screw 444 threaded in the upper end of the plunger and arranged to engage a shoulder on the arm 328. The member 424 is arranged to engage the insole near the edge of the latter and is provided with an inclined face 446 against which the margin of the upper is pressed by the toe wipers, the member 424 thus further acting as a retarder to render the edges of the wipers more effective in wiping the upper tightly and smoothly over the insole. As the wiping operation progresses the member 424 and the arm 430 are lifted against the resistance of the spring 440 by wedging action of the wipers on the inclined face 446, thus permitting the wipers to wipe the upper inwardly beneath the member 424.

The members 426 that engage the insole at the sides of the toe are mounted for limited rocking movements about axes extending laterally of the shoe on studs 448 which support these members on the forward ends of arms 450. The arms 450 near their other ends are mounted for swinging movements laterally of the shoe on studs 452 which are supported on holders 454, these holders being mounted for turning movements about the previously mentioned horizontal rod 432. Springs 456 connected to lugs on the holders 454 and to a pin 458 on the arm 328 tend to turn the holders in the direction to swing the arms 450 downwardly. Movements of the arms in this direction are limited by lugs 460 on the holders 454 in engagement with shoulders on the fixed bracket 434. Other springs 462 mounted between lugs on the arms 450 and other lugs on the holders 454 tend to swing the arms 450 about the studs 452 in directions to carry the members 426 toward each other. Movements of the arms in these directions are adjustably limited by inclined screws 464 which are threaded in the arms with their inner ends in engagement with lugs 466 formed on the holders 454. By this means each of the insole-engaging members 426 may be adjusted laterally of the shoe independently of the other member into proper position for engaging the insole in the right location, and it will be evident that these adjustments are unaffected by any upward or downward movements of the arms 450, since the holders 454 that carry the lugs 466 swing with the arms in these directions. The members 426 are provided with inclined faces 468 against which the upper is pressed by the toe wipers, so that these members also act as retarders and are wedged upwardly away from the insole by pressure of the wipers thereon in substantially the same manner as the member 424. It will be evident by reference to Fig. 21 that when the arm 328 is moved downwardly the member 424 is carried first into engagement with the insole, whereupon the spring 440 yields to permit the members 426 also to be carried into insole-engaging positions. The springs 456 then yield to permit the presser foot 326 to be pressed into firm engagement with the insole by further downward movement of the arm 328. It will be understood that the members 426 are located between the member 424 and the previously mentioned lasting straps 390 and control the insole substantially as far rearwardly as the portions of the shoe upon which the straps operate. Since the members 426 are controlled independently of the member 424, the wipers may begin to lift the member 424 from the insole without affecting the members 426 which remain in positions to hold the insole until the upper is wiped inwardly over the extreme edge of the insole by the portions of the wipers that are opposite these members. Insurance is thus afforded that the margin of the insole will be properly controlled all around the toe and also that the upper will be wiped tightly inward by the wipers at the sides of the toe as well as around the end of the toe.

Since the carriers 354 that support the toe band 368 are so mounted as to permit limited bodily lateral movement of the toe band, as previously described, the toe band is not adapted to position the toe portion of the last and shoe laterally with any very high degree of accuracy. The machine herein shown is accordingly provided with means which may be used with advantage under some conditions to determine more definitely the lateral position of the toe relatively to the toe wipers and relatively to the insole-controlling members carried by the arm 328 when these members are in operating positions. This means is shown in Figs. 16, 17 and 18 and comprises gage members 470 arranged to contact with the upper at the opposite sides of the toe end of the last, these members being supported on arms 472 of bell-crank levers 474 that are positioned over the toe wipers and are pivoted at 475 on brackets 476 secured on the top of the casing 356. The bell-crank levers 474 are connected by gear sectors 478 thereon for equalized swinging movements to position the gage members 470 at different distances from each other for shoes of different widths, and a spring 480 connected to one of the bell-crank levers tends to swing the levers in directions to separate the gage members from each other. Such swinging movement is adjustably limited by the end of a spindle 482 in contact with one of the arms 472, this spindle being threaded in a nut 484 which is slidingly mounted in a socket in one of the brackets 476 and is backed up by a spring 486, a pin 488 being provided to limit movement of the nut 484 under the influence of the spring and also to prevent the nut from turning. The nut 484 is therefore normally stationary, and by turning the spindle 482 the levers 474 may be adjusted as required. The gage members 470 are positioned over the toe band 368 and are mounted to turn on pins 490 on the arms 472, shoulders 492 on the arms being arranged to limit downward turning movements of the members. Spring-controlled plungers 494 in the arms 472 are arranged to bear on inclined faces 496 on the gage members and thus to hold them normally in the positions determined by the shoulders 492. In case the shoe should contact with one or the other of the gage members when it is lifted by the shoe-removing mechanism after the completion of the lasting operations, the member thus engaged will be turned upwardly by the shoe against the resistance of the plunger 494, thus avoiding damage to the shoe. Thereafter the plunger serves to return the member immediately to its normal position. If the gage members should be adjusted somewhat too closely together, the spring 486 will yield and thus permit the members and the arms 472 to be wedged farther apart by the shoe. In an organization of the character disclosed, in which the opposite side-lasting mechanisms are moved inwardly into engagement with the sides of the shoe prior to the downward movement of the shoe, this shoe-positioning means serves to insure against lateral displacement of the forepart of the shoe by the action of the side-lasting mechanisms.

It may be desirable under some conditions to position the forepart of the upper lengthwise and angularly in an accurately determined relation to the toe-lasting means, and for this purpose there may be utilized mechanism shown in Figs. 24 to 27, inclusive, this mechanism being arranged to occupy, in part, the position of the gaging mechanism shown in Fig. 16. For the purpose in view there are provided jig pins 498 arranged to extend laterally of the shoe and to enter jig holes previously provided in the marginal portion of the upper at the opposite sides of the toe. The jig pins are mounted on bell-crank levers 500 which are pivoted at 502 on arms 503 of other bell-crank levers 504, the latter being pivoted at 506 on a cover plate 508 which is mounted on the casing 356 over the toe wipers. A part of each of the bell-crank levers 500 consists of a flat spring arm 510 which may be sprung upwardly away from the arm 503 by use of a knob 512 and carries a pin 514 arranged to enter any one of a number of holes 516 in the arm 503. Each lever 500 may accordingly be adjusted independently of the other to vary the position of its jig pin 498 lengthwise of the shoe as required for determining accurately the proper positions of uppers of different styles or sizes. The bell-crank levers 504 are connected together by gear sectors 518 for equalized swinging movements about their pivots 506 in paths substantially parallel to the plane of the toe wipers, and their normal positions are adjustably determined by a screw 520 threaded in a fixed bracket 522 and engaging an arm 524 on one of the levers. A spring 526 connected to an arm 528 on the other lever holds the two levers yieldingly in the positions determined by the screw 520 which may be adjusted to vary the distance between the two jig pins 498 for shoes of different sizes.

It will be understood that the operator mounts the toe portion of the upper on the jig pins 498 in presenting the upper and last to the machine; and these jig pins must, of course, be withdrawn from the jig holes in the upper to permit the margin of the upper to be wiped inwardly over the insole by the toe wipers. In the construction herein shown there is provided means for withdrawing the jig pins from the upper by swinging movements of the bell-crank levers 504 prior to the actual starting of the power operation of the machine, but after the top of the forepart of the upper has been clamped between the last and the toe rest 334 by such tipping movement as the last receives by reason of the pressure of the heel band 52 against the heel end of the last when the slide 54 is moved toward the shoe by its operating spring. To understand the operation of this means it is necessary to refer to the fact that, as disclosed in the previously mentioned Letters Patent, the clutch through which the machine is operated by power is actuated or tripped to start the machine by swinging movement of the arm 328 (Fig. 1) about the axis of the two alined posts 330 and 332, the arm being maintained initially in an idle position at the rear of its operating position by a spring 530 (Figs. 24 and 25) which acts at one end on a collar 532 connected to the post 332 to turn therewith and is engaged at its other end by an adjustable abutment 534 on the frame of the machine. Extending through the spring 530 and pivotally connected to the collar 532 is a rod 536 which extends through an opening in the abutment 534. When the arm 328 is swung forwardly by the operator by means of the handle 442 the rod 536 is moved lengthwise by the turning of the collar 532 and by its movement operates a bell-crank lever 538 to lift a link 540 which corresponds to the link 932 shown in the previously mentioned Letters Patent and serves to trip the clutch. For withdrawing the jig pins 498 from the holes in the upper there is mounted on a rock shaft 542 supported by brackets 544 and 546 on the frame of the machine a lever arm 548 the lower end of which is in the path of the rod 536, and also fast on the rock shaft is an arm 550 provided with a pin 552 arranged to act on a link 554 which is pivotally connected to the previously mentioned arm 528 of one of the bell-crank levers 504. Accordingly when the rod 536 receives its lengthwise movement by the swinging of the arm 328 it acts through the arm 548 and the other parts described to swing the two bell-crank levers 504 about their pivots 506 in the directions to withdraw the jig pins from the upper. A slot 556 in the link 554, through which the pin 552 extends, permits such movement of the link relatively to the arm 550 as to allow for adjustments of the levers 504 by the screw 520. By reference to Fig. 25 it will be observed that the lower end of the arm 548 is located between the end of the rod 536 and a screw 558 carried by the depending arm of the bell-crank lever 538, and accordingly clutch-tripping movement is imparted to the lever 538 through the arm 548.

Means is further provided for rendering the arm 328, when desired, ineffective to start the machine or to trip the clutch by its forward swinging movement. This may be desirable in order to guard against accidental or unauthorized tripping of the clutch when the motor that drives the machine is idle, with consequent danger of damage or of injury to an operator from the unexpected starting of the machine thereafter simultaneously with the starting of the motor. On the other hand, when the motor is running it may sometimes be desirable to swing the arm 328 forwardly over the shoe without starting the machine for purposes of trial or of adjustment. The bell-crank lever 538 in the construction shown is accordingly mounted on a rod 560 supported in bearings in the bracket 544 for lengthwise sliding movements and is connected to the rod to move therewith, the rod being provided on one end with a head 562 for sliding it. By this means the bell-crank lever 538 may be moved laterally to such a position that the screw 558 is not engaged by the arm 548 when the latter is moved by the rod 536. To hold the rod 560 either in its normal position or in the position in which the screw 558 is out of the path of movement of the arm 548 there is provided in the bracket 544 a spring-pressed pin 564 with a rounded end arranged to enter either one of two angular grooves 566 in the rod.

Since the functions of the various novel mechanisms provided have been fully explained, with particular reference also to the full disclosure of the previously mentioned Letters Patent, no further description of the manner of operation of the machine is necessary for an understanding of the present invention.

Having described the invention, what I claim as new and desire to secure by Letters Patent of the United States is:

1. In a lasting machine, the combination with means for clamping upper materials around the heel end of a last, of devices supported by said clamping means for wiping the upper heightwise of the last at the sides only of its heel-end portion.

2. In a lasting machine, the combination with means for clamping upper materials around the heel end of a last, of devices supported by said clamping means for wiping the upper heightwise of the last at the sides of its heel-end portion, said devices and clamping means being relatively movable heightwise of the last in the wiping operation.

3. In a lasting machine, the combination with means for clamping upper materials around the heel end of a last, of devices supported by said clamping means for wiping the upper heightwise of the last at the sides of its heel-end portion, and mechanism for moving the last and said clamping means relatively to said devices to effect the wiping operation.

4. In a lasting machine, the combination with means for clamping upper materials including a counter around the heel end of a last, of devices supported by said clamping means for wiping heightwise of the last portions of the upper at the sides of the last where the forward ends of the counter are located, said devices and clamping means being relatively movable heightwise of the last in the wiping operation.

5. In a lasting machine, the combination with a heel band for clamping upper materials around the heel end of a last, and members supporting said heel band at the sides of the last for applying the band to the upper, of devices mounted on said members for wiping portions of the upper located forwardly of the heel band heightwise of the last.

6. In a lasting machine, the combination with a heel band for clamping upper materials around the heel end of a last, and members supporting said heel band at the sides of the last for applying the band to the upper, of devices mounted on said members for wiping portions of the upper located forwardly of the heel band heightwise of the last, said devices and members being relatively movable heightwise of the last in the wiping operation.

7. In a lasting machine, the combination with a heel band for clamping upper materials around the heel end of a last, and members supporting the ends of said heel band at the sides of the last for applying the band to the upper, of devices mounted on said members for wiping heightwise of the last portions of the upper located forwardly of the heel band, and mechanism for moving the last and heel band, together with said supporting members, relatively to said devices to effect the wiping operation.

8. In a lasting machine, the combination with a heel band for clamping upper materials around the heel end of a last, and members mounted for movements laterally of the last and supporting the ends of said heel band, of devices carried by said members and arranged to engage the upper at the sides of the last forwardly of the heel band and to wipe the upper in those locations heightwise of the last.

9. In a lasting machine, the combination with a heel band for clamping upper materials around the heel end of a last, and arms mounted for swinging movements laterally of the last and supporting the ends of said heel band, of devices carried by said arms for wiping the upper heightwise of the last forwardly of the heel band, said devices and arms being arranged for relative movement heightwise of the last in the wiping operation.

10. In a lasting machine, the combination with a heel band for clamping upper materials around the heel end of a last, and arms mounted for swinging movements laterally of the last and supporting the ends of said heel band, of devices carried by said arms for wiping the upper heightwise of the last forwardly of the heel band, said devices and arms being arranged for relative movement heightwise of the last, means for imparting to the last and said arms, together with the heel band, movement in a direction heightwise of the last, and means for preventing said wiping devices from partaking of that movement to cause them to wipe the upper heightwise of the last.

11. In a lasting machine, the combination with a heel band for clamping upper materials around the heel end of a last, and members mounted for movements laterally of the last and supporting the ends of said heel band, of devices carried by said members for wiping portions of the upper located forwardly of the heel band heightwise of the last, each of said devices comprising a wiping member and spring means for yieldingly pressing it against the side of the upper.

12. In a lasting machine, the combination with a heel band for clamping upper materials around the heel end of a last, and members mounted for movements laterally of the last and supporting the ends of said heel band, of devices carried by said members for wiping portions of the upper located forwardly of the heel band heightwise of the last, each of said devices comprising a wiping member supported for swinging movements about an axis extending lengthwise of the last and spring means tending to swing it in the direction to press it against the upper.

13. In a lasting machine, the combination with a heel band for clamping upper materials around the heel end of a last, and members mounted for movements laterally of the last and supporting the ends of said heel band, of devices carried by said members for wiping portions of the upper located forwardly of the heel band heightwise of the last, and means for moving the last and the heel band, together with said members, in a direction heightwise of the last relatively to said wiping devices to effect the wiping operation, each of said devices comprising a wiping member supported for swinging movements about an axis extending lengthwise of the last and a spring for swinging it in the direction to press it against the upper.

14. In a lasting machine, the combination with a support for a last with an upper thereon, of members mounted for movements laterally of the last and having means thereon for clamping the upper at the opposite sides of the heel end of the last, and devices carried by said members for wiping portions of the upper heightwise of the last, said devices and members being relatively movable heightwise of the last in the wiping operation.

15. In a lasting machine, the combination with a support for a last with an upper thereon, of arms mounted for swinging movements laterally of the last and provided with means for clamping the upper at the opposite sides of the heel end of the last, and devices carried by said arms for wiping heightwise of the last portions of the upper located forwardly of said clamping means.

16. In a lasting machine, the combination with a support for a last with an upper thereon, of members mounted for movements laterally of the last and having means thereon for clamping the upper at the opposite sides of the heel end of the last, devices carried by said members for wiping portions of the upper heightwise of the last, and mechanism for moving the last and said members relatively to said devices to effect the wiping operation.

17. In a lasting machine, the combination with a support for a last with an upper thereon, of members mounted for movements laterally of the last and having means thereon for clamping the upper at the opposite sides of the heel end of the last, and devices carried by said members for wiping heightwise of the last portions of the upper located forwardly of said clamping means, each of said devices comprising a wiping member and spring means for yieldingly pressing it against the upper.

18. In a lasting machine, the combination with a support for a last with an upper thereon, of members mounted for movements laterally of the last and having means thereon for clamping the upper at the opposite sides of the heel end of the last, and devices carried by said members for wiping heightwise of the last portions of the upper located forwardly of said clamping means, each of said devices comprising a wiping member, a carrier supporting said member and mounted for swinging movements about an axis extending lengthwise of the last, and a spring acting on said carrier to press the wiping member yieldingly against the upper.

19. In a lasting machine, the combination with means for clamping upper materials including a counter around the heel end of a last, and side-lasting mechanisms arranged to wipe the upper heightwise of the last at its opposite sides along the shank portion, of devices movable laterally of the last independently of said side-lasting mechanisms and arranged to act on the upper between said clamping means and side-lasting mechanisms to wipe the upper heightwise of the last toward the edge of the shoe bottom where the forward ends of the counter are located.

20. In a lasting machine, the combination with means for clamping upper materials including a counter around the heel end of a last, and side-lasting mechanisms arranged to act on the upper at its opposite sides along the shank portion, of mechanism for moving the last and said clamping means in a direction heightwise of the last relatively to the side-lasting mechanisms to cause said mechanisms to wipe the upper over the sides of the last toward the edge of the shoe bottom, and devices movable laterally of the last independently of said side-lasting mechanisms and arranged to act between said clamping means and side-lasting mechanisms in response to such movement of the last to wipe the upper heightwise of the last where the forward ends of the counter are located.

21. In a lasting machine, the combination with a heel band for clamping upper materials around the heel end of a last, members supporting the ends of said heel band and movable laterally of the last, and side-lasting mechanisms arranged to act on the upper along the sides of its shank portion, of means for moving the last and the heel band, together with its supporting members, in a direction heightwise of the last relatively to said side-lasting mechanisms to cause the latter to wipe the upper heightwise of the last, devices carried by said band-supporting members for engaging the upper at the sides of the last between the heel band and the side-lasting mechanisms, and means for preventing said devices from partaking of the movement of said members and the last to cause them to wipe the upper heightwise of the last.

22. In a lasting machine, the combination with a shoe support, of a band for clamping the upper of a shoe on said support around an end of the shoe, members connected to the ends of said band for controlling it, spring means tending to move said members apart to open the band, and stops against which the members are held by said spring means to limit their movements, said stops being adjustable to vary the distance between the ends of the band.

23. In a lasting machine, the combination with a shoe support, of a band for clamping the upper of a shoe on said support around an end of the shoe, levers having arms connected to the ends of said band and mounted for swinging movements laterally of the shoe, spring means tending to swing said arms apart while permitting them to be swung toward each other by pressure of the shoe on the intermediate portion of the band, said levers having other arms extending in different directions from their fulcrums than said first-named arms, and stops arranged to engage said other arms to determine adjustably the initial positions that the levers assume under the influence of said spring means.

24. In a lasting machine, the combination with a shoe support, of a band for clamping the upper of a shoe on said support around an end of the shoe, members connected to the ends of said band for controlling it, spring means tending to move said members apart while permitting them to be moved toward each other by pressure of the shoe on the intermediate portion of the band, and means for adjustably determining the initial positions that said members assume under the influence of said spring means while maintaining them at equal distances from a fixed point between them in all positions of their adjustment.

25. In a lasting machine, the combination with a shoe support, of a band for clamping the upper of a shoe on said support around an end of the shoe, arms connected to the ends of said band and mounted for swinging movements laterally of the shoe, spring means tending to swing said arms apart, and means for adjustably limiting the movements of the arms under the influence of said spring means while maintaining them at equal distances from a fixed point between them in all positions of their adjustment.

26. In a lasting machine, the combination with a shoe support, of a band for clamping the upper of a shoe on said support around an end of the shoe, members connected to the ends of said band for controlling it, spring means tending to move said members apart, and stops connected for equalized movements toward or from each other and arranged to limit adjustably the movements of said members under the influence of said spring means while maintaining the members at equal distances from a fixed point between them.

27. In a lasting machine, the combination with a shoe support, of a band for clamping the upper of a shoe on said support around an end of the shoe, arms connected to the ends of said band and mounted for swinging movements toward or from each other, spring means tending to swing said arms apart, and members connected for equalized movements toward or from each other and arranged to act as stops to limit adjustably the swinging movements of the arms under the influence of said spring means.

28. In a lasting machine, the combination with a shoe support, of a band for clamping the upper of a shoe on said support around an end of the shoe, levers fulcrumed between their opposite ends for swinging movements laterally of the shoe and connected at their forward ends to the ends of the band, spring means tending to swing the forward ends of said levers apart, and members arranged to act as stops on the rear ends of said levers to limit adjustably the movements of the levers under the influence of said spring means, said members being connected for equalized adjusting movements to vary the positions of the levers.

29. In a lasting machine, the combination with a shoe support, of a band for clamping the upper of a shoe on said support around an end of the shoe, levers fulcrumed between their opposite ends for swinging movements laterally of the shoe and connected at their forward ends to the ends of the band, spring means tending to swing the forward ends of said levers apart, arms connected for equalized swinging movements toward or from each other and arranged to act as stops in engagement with the rear ends of said levers to determine the positions that the levers assume under the influence of said spring means, and means for adjusting said arms to vary the positions of the levers.

30. In a lasting machine, the combination with a shoe support, of a band for clamping the upper of a shoe on said support around an end of the shoe, members connected to the ends of said band for controlling it, spring means tending to move said members apart, and means for adjustably limiting the movements of said members under the influence of said spring means, said limiting means being yieldable to permit the ends of the band to be forced farther apart by wedging action of the shoe thereon.

31. In a lasting machine, the combination with a shoe support, of a band for clamping the upper of a shoe on said support around an end of the shoe, members connected to the ends of said band for controlling it, spring means tending to move said members apart, and adjusting means for varying the initial positions that said members assume under the influence of said spring means while maintaining the members at equal distances from a fixed point between them, said adjusting means being yieldable to permit the ends of the band to be forced farther apart by wedging action of the shoe thereon.

32. In a lasting machine, the combination with a shoe support, of a band for clamping the upper of a shoe on said support around an end of the shoe, arms connected to the ends of said band and mounted for swinging movements toward or from each other, spring means tending to swing said arms apart, and members connected for equalized movements toward or from each other and arranged to act as stops to limit adjustably the swinging movements of the arms under the influence of said spring means, said members being yieldable to permit the arms to be forced farther apart by wedging action of the shoe on the band.

33. In a lasting machine, the combination with a shoe support, of a band for clamping the upper of a shoe on said support around an end of the shoe, arms connected to the ends of said band and mounted for swinging movements toward or from each other, spring means tending to swing said arms apart, members connected for equalized movements toward or from each other and arranged to act as stops to limit the movements of said arms under the influence of said spring means, and means for adjusting said members to vary the initial positions of the arms, said adjusting means including a spring yieldable to permit the arms to be forced farther apart by wedging action of the shoe on the band.

34. In a lasting machine, the combination with a shoe support, of a band for clamping the upper of a shoe on said support around the heel end of the shoe, said shoe support and band being relatively movable lengthwise of the shoe to apply the band to the shoe, spring means tending to move the ends of the band apart while permitting them to be moved toward each other by pressure of the shoe on the intermediate portion of the band, and means for adjustably determining the initial positions that the ends of the band assume under the influence of said spring means.

35. In a lasting machine, the combination with a shoe support, of a band for clamping the upper of a shoe on said support around the heel end of the shoe, said shoe support and band being relatively movable lengthwise of the shoe to apply the band to the shoe, spring means tending to move the ends of the band apart while permitting them to be moved toward each other by pressure of the shoe on the intermediate portion of the band, and means for adjusting the ends of the band laterally of the shoe while maintaining them at equal distances from a fixed point between them in all positions of their adjustment.

36. In a lasting machine, the combination with a shoe support and end-lasting wipers, of a wiper carrier mounted for movement lengthwise of a shoe on said support to impart to the wipers wiping movement in that direction, connections to said wipers for closing them laterally of the shoe in response to said movement of the wiper carrier, a member arranged to control said connections to render them effective to close the wipers, said member being arranged to partake of the first portion of the wiper-operating movement of the wiper carrier, and an abutment arranged to stop the movement of said member at a predetermined time in the movement of the wiper carrier to initiate the closing of the wipers and for thereafter holding said member stationary as the movement of the wiper carrier continues.

37. In a lasting machine, the combination with a shoe support and end-lasting wipers, of a wiper carrier mounted for movement lengthwise of a shoe on said support to impart to the wipers wiping movement in that direction, connections to said wipers for closing them laterally of the shoe in response to said movement of the wiper carrier, a member arranged to control said connections to render them effective to close the wipers, said member being arranged to partake of the first portion of the wiper-operating movement of the wiper carrier, and adjustable means for variably limiting the movement of said member to initiate the closing of the wipers and for thereafter maintaining the member stationary as the movement of the wiper carrier continues.

38. In a lasting machine, the combination with a shoe support and end-lasting wipers, of a wiper carrier mounted for movement lengthwise of a shoe on said support to impart to the wipers wiping movement in that direction, links connected to said wipers for imparting to them closing movements laterally of the shoe in response to said movement of the wiper carrier, a member connected to said links to render them effective to close the wipers, said member being arranged to partake of the first portion of the wiper-operating movement of the wiper carrier, and means for stopping the movement of said member at a predetermined point in the movement of the wiper carrier to initiate the closing of the wipers and for thereafter holding the member stationary as the movement of the wiper carrier continues.

39. In a lasting machine, the combination with a shoe support and end-lasting wipers, of a plunger mounted for movement lengthwise of a shoe on said support to impart to the wipers wiping movement in that direction, a member in which said plunger is thus movable, links connected to said wipers for imparting to them closing movements laterally of the shoe in response to the movement of the plunger, a device connected to said links to render them effective to close the wipers, said device being mounted for movement along said member with the plunger, and means for stopping the movement of said device at a predetermined point in the movement of the plunger to initiate the closing of the wipers and for thereafter holding the device stationary as the movement of the plunger continues.

40. In a lasting machine, the combination with a shoe support and end-lasting wipers, of a plunger mounted for movement lengthwise of a shoe on said support to impart to the wipers wiping movement in that direction, a member in which said plunger is thus movable, links connected to said wipers for imparting to them closing movements laterally of the shoe in response to the movement of the plunger, a device connected to said links to render them effective to close the wipers, said device being mounted for movement along said member with the plunger, and a screw carried by said device and arranged to engage a relatively stationary portion of the machine to stop the movement of the device and thus to initiate the closing of the wipers, said screw being adjustable to vary the time when the closing of the wipers begins.

41. In a lasting machine, the combination with a shoe support, heel-lasting wipers, a heel band for clamping the upper of a shoe on said support around the heel end of the shoe, and a support for said heel band and wipers movable to carry them toward the shoe and to apply the heel band to the shoe, of a wiper carrier mounted on said last-named support for movement lengthwise of the shoe to impart to the wipers wiping movement in that direction, connections to said wipers for closing them laterally of the shoe in response to said movement of the wiper carrier, means for controlling said connections to render them effective to close the wipers, said controlling means being arranged to partake of the first portion of the wiper-operating movement of the wiper carrier, and means mounted independently of the support for the heel band and wipers for stopping the movement of said controlling means to effect the closing of the wipers.

42. In a lasting machine, the combination with a shoe support, heel-lasting wipers, a heel band for clamping the upper of a shoe on said support around the heel end of the shoe, and a support for said heel band and wipers movable to carry them toward the shoe and to apply the heel band to the shoe, of a wiper carrier mounted on said last-named support for movement lengthwise of the shoe to impart to the wipers wiping movement in that direction, links connected to said wipers for imparting to them closing movements laterally of the shoe in response to the wiper-operating movement of the wiper carrier, a member connected to said links to render them effective to close the wipers, said member being mounted for movement lengthwise of the shoe with the wiper carrier, and means mounted independently of the support for the heel band and wipers for stopping the movement of said member to effect the closing of the wipers.

43. In a lasting machine, the combination with a shoe support, heel-lasting wipers, a heel band for clamping the upper of a shoe on said support around the heel end of the shoe, and a support for said heel band and wipers movable to carry them toward the shoe and to apply the heel band to the shoe, of a plunger on said last-named support movable lengthwise of the shoe to impart to the wipers wiping movement in that direction, a member in which the plunger is thus movable, links connected to said wipers for imparting to them closing movements laterally of the shoe in response to the movement of the plunger, a device connected to said links to render them effective to close the wipers, said device being mounted for movement along said member with the plunger, an abutment mounted independently of the support for the heel band and wipers for stopping the movement of said device to effect the closing of the wipers, and a screw on said device arranged to engage said abutment to stop the movement of the device and adjustable to vary the time when the closing of the wipers begins.

44. In a lasting machine, the combination with a shoe support, and wipers arranged to wipe the margin of the upper of a shoe on said support inwardly over the bottom of the shoe around an end thereof and mounted for tipping movements laterally of the shoe, of a presser foot arranged to engage the bottom of the shoe, a support for said presser foot mounted for tipping movements laterally of the shoe and having means for also tipping the wipers to positions determined by contact of the presser foot with the shoe bottom, and adjustable means for variably limiting tipping movements of said presser foot support.

45. In a lasting machine, the combination with a shoe support, and wipers arranged to wipe the margin of the upper of a shoe on said support inwardly over the bottom of the shoe around an end thereof and mounted for tipping movements laterally of the shoe, of a presser foot arranged to engage the bottom of the shoe, a support for said presser foot mounted for tipping movements laterally of the shoe and having means for also tipping the wipers to positions determined by contact of the presser foot with the shoe bottom, a stop for limiting tipping movements of said presser foot support, and members connected for equalized adjusting movements toward and from each other and arranged to engage said stop to determine the limits of tipping movements of said support in opposite directions.

46. In a lasting machine, the combination with end-lasting wipers, of a shoe support, a spring tending to move said shoe support in a direction heightwise of a shoe thereon, a member for engaging the bottom of the shoe to position it relatively to the wipers against the force of said spring, a latch arranged to hold said member against movement in response to pressure of the shoe thereon, and means for operating said latch at a predetermined time in the operation of the machine to release said member and permit the shoe to be forced more firmly against the wipers by the spring.

47. In a lasting machine, the combination with end-lasting wipers, of a shoe support, a spring tending to move said shoe support in a direction heightwise of a shoe thereon, a member for engaging the bottom of the shoe to position it relatively to the wipers against the force of said spring, a latch arranged to hold said member against movement in response to pressure of the shoe thereon, means to cause the latch to release said member for movement heightwise of the shoe at a predetermined time in the operation of the machine to permit the shoe to be forced more firmly against the wipers by the spring, and automatic means for thereafter returning said member into position to be held by the latch.

48. In a lasting machine, the combination with end-lasting wipers, of a shoe support, a presser foot arranged to engage the bottom of a shoe on said support to determine the relation between the shoe and the wipers, a slide supporting said presser foot and movable in directions heightwise of the shoe, a second slide, a latch carried by one of said slides and arranged to act on the other slide to maintain the presser foot in a fixed position heightwise of the shoe in the wiping operation, means for operating said latch to release the presser foot at a predetermined time in the operation of the machine to permit relative movement of the shoe and the wipers to increase the pressure of the wipers on the upper, and means arranged to act through said second slide to adjust the presser foot heightwise of the shoe.

49. In a lasting machine, the combination with a shoe support, lasting means, and means for removing a shoe from said support after the lasting operation, of mechanism arranged to be operated by said shoe-removing means to withdraw said lasting means from the shoe.

50. In a lasting machine, the combination with a shoe support, lasting means, and means including a reciprocatory member for removing a shoe from said support after the lasting operation, of mechanism arranged to be operated by said reciprocatory member to withdraw said lasting means from the shoe.

51. In a lasting machine, the combination with a shoe support, of heel-lasting mechanism movable toward and from a shoe on said support, a device connected to said lasting mechanism for withdrawing it from the shoe after the lasting operation, means for removing the shoe from the shoe support, and a member arranged to be operated by said shoe-removing means and to act on said device to withdraw said lasting mechanism from the shoe.

52. In a lasting machine, the combination with a shoe support, of heel-lasting mechanism movable toward and from a shoe on said support, a device connected to said lasting mechanism for withdrawing it from the shoe after the lasting operation, means including a reciprocatory member for removing the shoe from the shoe support and an arm carried by said member and arranged to act on said device to withdraw said lasting mechanism from the shoe.

53. In a lasting machine, the combination with a shoe support, of heel-lasting mechanism movable toward and from a shoe on said support, a spring for moving said mechanism toward the shoe, a latch for holding the mechanism initially in a position removed from the shoe and for releasing it to the action of said spring prior to the lasting operation, means for removing the shoe from the shoe support after the lasting operation, and mechanism arranged to be operated by said shoe-removing means to withdraw the lasting mechanism from the shoe into position to be held by said latch.

54. In a lasting machine, the combination with a shoe support, of heel-lasting mechanism movable toward and from a shoe on said support, a spring for moving said mechanism toward the shoe, a latch for holding the mechanism initially in a position removed from the shoe and for releasing it to the action of said spring prior to the lasting operation, a device connected to said lasting mechanism for withdrawing it from the shoe into position to be held by said latch, means including a reciprocatory member for removing the shoe from the shoe support, and an arm carried by said member and arranged to act on said device to withdraw said lasting mechanism from the shoe.

55. In a lasting machine, the combination with means for lasting an upper over an insole on a last along the opposite sides of the shank portion of the insole, of a device arranged to engage the shank portion of the insole to press the latter close to the bottom of the last, said device being mounted for swinging movements into and out of operative position about an axis extending widthwise of the last and being adjustable along its axis to position it in proper relation to the bottoms of shoes made on lasts of different styles.

56. In a lasting machine, the combination with means for lasting an upper over an insole on a last along the opposite sides of the shank portion of the insole, of a device arranged to engage the shank portion of the insole to press the latter close to the bottom of the last, a rock shaft on which said device is mounted for swinging movements into and out of operative position about an axis extending widthwise of the last, and means for adjustably moving said device along the rock shaft to position it in proper relation to the bottoms of shoes made on lasts of different styles.

57. In a lasting machine, the combination with opposite side-lasting mechanisms for lasting an upper over an insole on a last along the shank portion of the insole, and means for depressing the last and shoe relatively to said lasting mechanisms, of a device carried by said shoe-depressing means for engaging the shank portion of the insole to press the latter close to the bottom of the last, said device being movable relatively to the shoe-depressing means into and out of operative position and also adjustable in directions widthwise of the last to position it in proper relation to the bottoms of shoes made on lasts of different styles.

58. In a lasting machine, a flexible lasting member arranged to act upon an upper on a last to work the upper heightwise of the last by frictional contact therewith and also to lay the marginal portion of the upper inwardly over an insole on the last, and means constructed and arranged to clamp the marginal portion of the upper against said flexible member to assist in working the upper heightwise of the last and in laying its marginal portion smoothly and tightly over the insole.

59. In a lasting machine, a flexible lasting member arranged to act upon an upper on a last to work the upper heightwise of the last by frictional contact therewith and also to lay the marginal portion of the upper inwardly over an insole on the last, and a device constructed and arranged to clamp the marginal portion of the upper yieldingly against said flexible member to assist in working the upper heightwise of the last and to control its margin as it is laid inwardly over the insole while permitting the margin of the upper to be progressively withdrawn from between said device and member.

60. In a lasting machine, a flexible lasting member for engaging an upper on a last, mechanism for effecting relative movement of said member and the last to cause said member to work the upper heightwise of the last by frictional contact therewith, overlaying means arranged to act through said member to lay the marginal portion of the upper inwardly over an insole on the last, and means constructed and arranged to clamp the marginal portion of the upper against said flexible member to assist in working the upper heightwise of the last and in laying its marginal portion smoothly and tightly over the insole.

61. In a lasting machine, a flexible lasting member for engaging an upper on a last, mechanism for effecting relative movement of said member and the last to cause said member to work the upper heightwise of the last by frictional contact therewith, overlaying means arranged to act through said member to lay the marginal portion of the upper inwardly over an insole on the last, and a device constructed and arranged to clamp the marginal portion of the upper yieldingly against said flexible member to assist in working the upper heightwise of the last while permitting the upper to be partially withdrawn from between said device and member in that operation, said clamping device being movable inwardly over the bottom of the last with the overlaying means to control the margin of the upper in the overlaying operation.

62. In a lasting machine, a flexible lasting member for engaging an upper on a last, means for moving the last heightwise relatively to said flexible member to cause said member to work the upper heightwise of the last by frictional contact therewith, overlaying means arranged to act thereafter through said flexible member to lay the margin of the upper inwardly over an insole on the last, and a device constructed and arranged to clamp the marginal portion of the upper yieldingly against said flexible member prior to the heightwise movement of the last to assist in working the upper tightly over the last.

63. In a lasting machine, a flexible lasting member for engaging an upper on a last, means for moving the last heightwise relatively to said flexible member to cause said member to work the upper heightwise of the last by frictional contact therewith, overlaying means arranged to act thereafter through said flexible member to lay the margin of the upper inwardly over an insole on the last, and a device constructed and arranged to clamp the marginal portion of the upper yieldingly against said flexible member prior to the heightwise movement of the last to assist in working the upper tightly over the last, said device being movable inwardly over the shoe bottom with the overlaying means to control the margin of the upper in the overlaying operation.

64. In a lasting machine, side-lasting means comprising a flexible lasting member arranged to engage an upper on a last and to lay the marginal portion of the upper inwardly over an insole on the last, and a device supported on said side-lasting means and constructed and arranged to clamp the marginal portion of the upper against said flexible member to control the upper in the overlaying operation while permitting the upper to be progressively withdrawn from between said device and member in that operation.

65. In a lasting machine, a flexible lasting member for engaging an upper on a last and laying the marginal portion of the upper inwardly over an insole on the last, movable means arranged to operate said flexible member to lay the upper over the insole, and a device carried by said movable means for clamping the marginal portion of the upper against said flexible member to control the upper in the overlaying operation.

66. In a lasting machine, a flexible lasting member for engaging an upper on a last, an overlaying member movable inwardly over the shoe bottom and arranged to act through said flexible member to lay the marginal portion of the upper over an insole on the last, and a device arranged to clamp the marginal portion of the upper yieldingly against said flexible member prior to the movement of the overlaying member and to control the margin of the upper in the overlaying operation.

67. In a lasting machine, a flexible lasting strap for engaging an upper on a last, an overlaying member movable inwardly over the shoe bottom and arranged to act through said strap to lay the marginal portion of the upper over an insole on the last, and a device arranged to clamp the marginal portion of the upper yieldingly against said strap prior to the movement of the overlaying member and to serve as a retarder to control the margin of the upper in the overlaying operation.

68. In a lasting machine, a flexible lasting member for engaging an upper on a last, an overlaying member arranged to act through said flexible member to lay the marginal portion of the upper inwardly over an insole on the last, a support for said overlaying member movable to force the latter inwardly over the insole, and a device carried by said support for clamping the marginal portion of the upper yieldingly against said flexible member to control the margin of the upper in the overlaying operation.

69. In a lasting machine, a flexible lasting strap for engaging an upper on a last, an overlaying member arranged to act through said strap to lay the marginal portion of the upper inwardly over an insole on the last, a support for said overlaying member movable to force the latter inwardly over the insole, and a device carried by said support for clamping the marginal portion of the upper against said strap to control the margin of the upper in the overlaying operation.

70. In a lasting machine, a flexible lasting member for engaging an upper on a last, an overlaying member arranged to act through said flexible member to lay the marginal portion of the upper inwardly over an insole on the last and movable inwardly over the shoe bottom relatively to the flexible member, a support for said overlaying member movable to force the latter inwardly over the shoe bottom, and a device carried by said support for clamping the marginal portion of the upper against said flexible member to control the margin of the upper in the overlaying operation, said device being arranged to permit the upper to slip out from between it and the flexible member prior to the completion of the overlaying operation.

71. In a lasting machine, lasting mechanism movable to lay the marginal portion of an upper inwardly over an insole on a last and including a flexible member of sheet material for engaging the upper to lay it over the insole, and a device carried by said lasting mechanism for clamping the marginal portion of the upper against said flexible member to control the margin of the upper in the overlaying operation.

72. In a lasting machine, lasting mechanism movable to lay the marginal portion of an upper inwardly over an insole on a last and including a flexible member of sheet material for engaging the upper to lay it over the insole, and a device carried by said lasting mechanism for clamping the marginal portion of the upper against said flexible member to control the margin of the upper in the overlaying operation, said device comprising a flexible resilient clamping member for engaging the upper.

73. In a lasting machine, lasting mechanism movable to lay the marginal portion of an upper inwardly over an insole on a last and including a flexible member for engaging the upper to lay it over the insole, a member carried by said lasting mechanism for clamping the marginal portion of the upper yieldingly against said flexible member to control the margin of the upper in the overlaying operation, and spring means arranged to hold said clamping member in clamping position and against the resistance of which said member is movable relatively to the lasting mechanism to receive the upper.

74. In a lasting machine, lasting mechanism movable to lay the marginal portion of an upper inwardly over an insole on a last and including a flexible member for engaging the upper to lay it over the insole, and a member carried by said lasting mechanism for clamping the marginal portion of the upper yieldingly against said flexible member to control the margin of the upper in the overlaying operation, said clamping member being movable relatively to the lasting mechanism in a direction transverse to the height of the last and also heightwise of the last to receive the upper.

75. In a lasting machine, flexible means arranged to act upon an upper on a last at the opposite sides of the shank portion to work the upper heightwise of the last by frictional contact therewith and also to lay the marginal portion of the upper inwardly over an insole on the last, and devices constructed and arranged to clamp the marginal portion of the upper against said flexible means at the opposite sides of the last to assist in working the upper heightwise of the last and in laying its marginal portion smoothly and tightly over the insole.

76. In a lasting machine, flexible means arranged to act upon an upper on a last at the opposite sides of the shank portion to work the upper heightwise of the last by frictional contact therewith, overlaying devices arranged to act through said flexible means to lay the marginal portion of the upper inwardly over an insole on the last, and devices constructed and arranged to clamp the marginal portion of the upper against said flexible means to assist in working the upper heightwise of the last, said clamping devices being movable inwardly over the shoe bottom with the overlaying devices to control the marginal portion of the upper also in the overlaying operation.

77. In a lasting machine, opposite side-lasting mechanisms movable to lay the marginal portion of an upper inwardly over an insole on a last and each comprising a flexible member for engaging the upper to lay it over the insole, and devices carried by said side-lasting mechanisms and each arranged to clamp the marginal portion of the upper yieldingly against the flexible member to control the margin of the upper in the overlaying operation.

78. In a lasting machine, opposite side-lasting mechanisms movable to lay the marginal portion of an upper inwardly over an insole on a last and comprising flexible straps for engaging the upper to lay it over the insole, and devices carried by said side-lasting mechanisms for clamping the marginal portion of the upper yieldingly against said straps to serve as retarders in engagement with the upper while permitting its margin to slip out from between them and the straps prior to the completion of the overlaying operation.

79. In a lasting machine, opposite side-lasting mechanisms movable to lay the marginal portion of an upper inwardly over an insole on a last and each comprising a flexible member for engaging the upper to lay it over the insole, and devices carried by said side-lasting mechanisms for controlling the margin of the upper in the overlaying operation, each of said devices being arranged to press the upper yieldingly against the flexible member and being movable relatively to the lasting mechanism in different directions to receive the upper.

80. In a lasting machine, opposite side-lasting mechanisms movable to lay the marginal portion of an upper inwardly over an insole on a last and each comprising a flexible member for engaging the upper to lay it over the insole, and devices carried by said side-lasting mechanisms for controlling the margin of the upper in the overlaying operation, each of said devices comprising one or more flexible resilient fingers for clamping the upper against the flexible upper-engaging member.

81. In a lasting machine, flexible means for engaging an upper at the opposite sides of a last to lay its margin inwardly over an insole on the last, members arranged to act through said flexible means to lay the margin of the upper over the insole, arms movable inwardly toward the sides of the last to operate said members, and devices carried by said arms for clamping the marginal portion of the upper against said flexible means to control the margin of the upper in the overlaying operation.

82. In a lasting machine, flexible means for engaging an upper at the opposite sides of a last to lay its margin inwardly over an insole on the last, members arranged to act through said flexible means to lay the margin of the upper over the insole, arms movable inwardly toward the sides of the last to operate said members, members carried by said arms for clamping the marginal portion of the upper against said flexible means to control the margin of the upper in the overlaying operation, and supports for said clamping members movable relatively to the arms widthwise of the last and relatively to which said members are mounted for swinging movements heightwise of the last to receive the upper.

83. In a lasting machine, flexible means for engaging an upper at the opposite sides of a last to lay its margin inwardly over an insole on the last, members arranged to act through said flexible means to lay the margin of the upper over the insole, arms movable inwardly toward the sides of the last to operate said members, members carried by said arms for clamping the marginal portion of the upper against said flexible means to control the margin of the upper in the overlaying operation, supports for said clamping members movable relatively to the arms widthwise of the last, and springs tending to move said supports outwardly to hold the clamping members in clamping positions and against the resistance of which the supports and clamping members are movable inwardly to receive the upper.

84. In a lasting machine, flexible means for engaging an upper at the opposite sides of a last to lay its margin inwardly over an insole on the last, members arranged to act through said flexible means to lay the margin of the upper over the insole, arms movable inwardly toward the sides of the last to operate said members, members carried by said arms for clamping the marginal portion of the upper against said flexible means to control the margin of the upper in the overlaying operation, supports for said clamping members slidingly mounted for movements widthwise of the last and on which the members are supported for swinging movements heightwise of the last, and springs tending to move said supports outwardly and also to swing the clamping members toward clamping positions while permitting the supports and members to be moved against the resistance of the springs to receive the upper.

85. In a lasting machine, opposite side-lasting mechanisms movable widthwise of a last and each having means for engaging the marginal portion of an upper to lay it inwardly over an insole on the last, and devices carried by said side-lasting mechanisms for clamping the marginal portion of the upper yieldingly against said upper-engaging means to control the margin of the upper in the overlaying operation, each of said devices comprising a spring-controlled upper-clamping member supported for swinging movement heightwise of the last to position it in clamping relation to the upper.

86. In a lasting machine, opposite side-lasting mechanisms movable widthwise of a last and each having means for engaging the marginal portion of an upper to lay it inwardly over an insole on the last, and devices carried by said side-lasting mechanisms for clamping the marginal portion of the upper yieldingly against said upper-engaging means to control the margin of the upper in the overlaying operation, each of said devices comprising an upper-clamping member, a support for said member mounted for movement widthwise of the last relatively to the side-lasting mechanism by which it is carried, and a spring tending to move said support in the direction to press the clamping member against the upper while permitting it to be moved with the clamping member in the opposite direction to receive the upper.

87. In a lasting machine, opposite side-lasting mechanisms movable widthwise of a last and each having means for engaging the marginal portion of an upper to lay it inwardly over an insole on the last, and devices carried by said side-lasting mechanisms for clamping the marginal portion of the upper yieldingly against said upper-engaging means to control the margin of the upper in the overlaying operation, each of said devices comprising an upper-clamping member supported for movement widthwise of the last relatively to the side-lasting mechanism by which it is carried and also supported for swinging movement about an axis extending lengthwise of the last, and spring means arranged to hold said member in clamping relation to the upper and against the resistance of which it is movable both widthwise of the last and about its axis to receive the upper.

88. In a lasting machine, opposite side-lasting mechanisms movable widthwise of a last and each having means for engaging the marginal portion of an upper to lay it inwardly over an insole on the last, and devices carried by said side-lasting mechanisms for clamping the marginal portion of the upper yieldingly against said upper-engaging means to control the margin of the upper in the overlaying operation, each of said devices comprising a flexible resilient upper-clamping member and a spring-controlled support for said member movable with the member relatively to the side-lasting mechanism by which it is carried to receive the upper.

89. In a lasting machine, devices for wiping an upper heightwise of a last at the opposite sides of the last, said devices being mounted for movements widthwise of the last to adjust themselves to the last, and mechanism comprising an adjusting member common to both said devices for varying the distance between them while permitting both devices to move simultaneously in the same direction widthwise of the last.

90. In a lasting machine, devices for wiping an upper heightwise of a last at the opposite sides of the last, said devices being mounted for movements widthwise of the last to adjust themselves to the last, spring means tending to move said devices toward each other while permitting them to be forced apart by wedging action of the last thereon, and adjusting mechanism extending from one of said devices to the other for variably limiting their movements toward each other while permitting them both to move in unison in one direction or the other widthwise of the last to adjust themselves to the last.

91. In a lasting machine, devices for wiping an upper heightwise of a last at the opposite sides of the last, said devices being mounted for movements widthwise of the last to adjust themselves to the last, spring means tending to move said devices toward each other while permitting them to be forced apart by wedging action of the last thereon, and adjusting mechanism comprising a rotatable member extending from one of said devices to the other and having means thereon for adjustably limiting the movements of the devices toward each other while permitting both devices to move in unison in one direction or the other widthwise of the last to adjust themselves to the last.

92. In a lasting machine, members for wiping an upper heightwise of a last at the opposite sides of the last, arms supporting said members and mounted for swinging movements widthwise of the last to permit the members to adjust themselves to the last, spring means for swinging said arms toward each other while permitting them to be forced apart by wedging action of the last on said members, and an adjusting device common to both said arms for variably limiting their movements toward each other while permitting them both to swing in unison in one direction or the other widthwise of the last.

93. In a lasting machine, the combination with wipers for wiping the margin of an upper inwardly over the bottom of a last around the toe end of the last, of flexible lasting straps arranged to be operated by said wipers to lay portions of the margin of the upper inwardly over the bottom of the last at the opposite sides of the forepart, members arranged to act on said straps to press them against the upper at the opposite sides of the last, said members being mounted for movements widthwise of the last to permit them to adjust themselves to the last, spring means tending to move said members toward each other while permitting them to be forced apart by wedging action of the last thereon, and an adjusting device common to both said members for variably limiting their movements toward each other while permitting both members to move in unison in one direction or the other widthwise of the last.

94. In a lasting machine, the combination with wipers for wiping the margin of an upper inwardly over the bottom of a last around the toe end of the last, of flexible lasting straps arranged to be operated by said wipers to lay portions of the margin of the upper inwardly over the bottom of the last at the opposite sides of the forepart, arms mounted for swinging movements widthwise of the last and arranged to press said straps against the upper at the opposite sides of the last, spring means tending to swing said arms toward each other while permitting them to be forced apart by wedging action of the last thereon, and a rotatable adjusting member extending from one of said arms to the other and provided with means for variably limiting the movements of the arms toward each other while permitting both arms to swing in unison in one direction or the other widthwise of the last.

95. In a lasting machine, a device for engaging the upper of a shoe on a last frictionally at the top of the forepart, and automatic means for imparting to said device a movement of variably predetermined extent lengthwise of the last to pull the upper toward the toe end of the last.

96. In a lasting machine, a device for engaging the upper of a shoe on a last frictionally at the top of the forepart, means for moving said device and the last together in a direction heightwise of the last, a cam arranged to act in response to such movement of the device to move it also in a direction to pull the upper forwardly toward the toe end of the last, and means for varying the amount of movement imparted to the device by said cam.

97. In a lasting machine, a device for engaging the upper of a shoe on a last frictionally at the top of the forepart, means for moving said device and the last together in a direction heightwise of the last, a cam arranged to act in response to such movement of the device to move it also in a direction to pull the upper forwardly toward the toe end of the last, and means for adjusting the initial relation of the device to the cam to vary the amount of the movement imparted to the device by the cam.

98. In a lasting machine, the combination with means for wiping the margin of an upper inwardly over the bottom of a last around an end of the last, of a plurality of members arranged to be positioned in the path of said wiping means to press the margin of the upper against said means in the wiping operation, said members being movable independently of one another heightwise of the last in response to wedging action of the wiping means thereon to permit the margin of the upper to be wiped inwardly between said members and the last.

99. In a lasting machine, the combination with means for wiping the margin of an upper inwardly over the bottom of a last around an end of the last, of a plurality of members arranged to rest on the shoe bottom in the path of said wiping means at the end and the sides of the shoe bottom respectively and against which the margin of the upper is wiped by said means, the different members being movable independently of one another heightwise of the last in response to wedging action of the wiping means thereon.

100. In a lasting machine, the combination with wipers for wiping the margin of an upper inwardly over an insole on a last around the toe-end portion of the last, of a member arranged to engage the marginal portion of the insole at the end of the toe to press it close to the bottom of the last, and other members arranged to engage and control the marginal portion of the insole at the opposite sides of the toe, several members being movable heightwise of the last away from the insole in response to wedging action of the wipers thereon and the member at the end of the toe being thus movable independently of the members at the sides of the toe.

101. In a lasting machine, the combination with wipers for wiping the margin of an upper inwardly over an insole on a last around the toe-end portion of the last, of a plurality of members arranged to press the marginal portion of the insole close to the bottom of the last at the end and the sides of the toe respectively as the wipers begin to wipe the upper over the insole, said members being movable independently of one another heightwise of the last away from the insole in response to wedging action of the wipers thereon as the wipers continue their wiping movements.

102. In a lasting machine, the combination with wipers for wiping the margin of an upper inwardly over an insole on a last around the toe-end portion of the last, of a plurality of members arranged to be positioned in the paths of the wipers to press the margin of the upper against the wipers at the end and the sides of the toe respectively as the upper is wiped inwardly over the insole, said members being movable independently of one another heightwise of the last in response to wedging action of the wipers thereon to permit the upper to be wiped inwardly between said members and the insole.

103. In a lasting machine, the combination with wipers for wiping the margin of an upper inwardly over an insole on a last around the toe-end portion of the last, of a plurality of members arranged to engage the insole respectively at the end and the sides of the toe to press it close to the bottom of the last, a plurality of arms supporting the different members and mounted for swinging movements independently of one another heightwise of the last each about an axis extending widthwise of the last, and means arranged to act on said arms to press the different members against the insole and yieldable in response to pressure of the wipers on said members to permit the members to be forced away from the insole by the wipers.

104. In a lasting machine, the combination with wipers for wiping the margin of an upper inwardly over an insole on a last around the toe-end portion of the last, of a plurality of members arranged to engage the insole respectively at the end and the sides of the toe to press it close to the last and also to engage the margin of the upper to press it against the edges of the wipers as the upper is wiped inwardly over the insole, a plurality of arms supporting the different members and mounted for swinging movements heightwise of the last each about an axis extending widthwise of the last, and spring means arranged to act on said arms to force the different members toward the insole and yieldable in response to wedging action of the wipers on said members to permit the members to be forced away from the insole by the wipers.

105. In a lasting machine, the combination with wipers for wiping the margin of an upper inwardly over an insole on a last around the toe-end portion of the last, of a plurality of members arranged to engage the insole respectively at the end and the sides of the toe to press its marginal portion close to the bottom of the last, said members being movable heightwise of the last away from the insole in response to pressure of the wipers thereon in wiping the upper over the insole and the members at the sides of the toe being adjustable toward and from each other for operating on shoes of different widths.

106. In a lasting machine, the combination with wipers for wiping the margin of an upper inwardly over an insole on a last around the toe-end portion of the last, of a plurality of members arranged to engage the insole respectively at the end and the sides of the toe to press its marginal portion close to the bottom of the last, said members being movable heightwise of the last away from the insole in response to pressure of the wipers thereon in wiping the upper over the insole, and means for adjusting the members at the sides of the toe each independently of the other widthwise of the last for operating on shoes of different widths.

107. In a lasting machine, the combination with wipers for wiping the margin of an upper inwardly over an insole on a last around the toe-end portion of the last, of a plurality of members arranged to engage the insole respectively at the end and the sides of the toe to press its marginal portion close to the bottom of the last, a plurality of arms supporting the different members and mounted for swinging movements independently of one another heightwise of the last each about an axis extending widthwise of the last in response to wedging action of the wipers on said members to permit the members to be forced away from the insole by the wipers, the arms that support the members at the sides of the toe being mounted for swinging movements also widthwise of the last, and means for adjusting said last-named arms toward or from each other for operating on shoes of different widths.

108. In a lasting machine, the combination with wipers for wiping the margin of an upper inwardly over an insole on a last at the opposite sides of the shoe bottom, of members arranged to press the marginal portion of the insole close to the bottom of the last at the sides of the shoe bottom, said members being movable independently of each other heightwise of the last away from the insole in response to wedging action of the wipers thereon in wiping the upper over the insole.

109. In a lasting machine, the combination with wipers for wiping the margin of an upper inwardly over an insole on a last at the opposite sides of the shoe bottom, of members arranged to press the marginal portion of the insole close to the bottom of the last at the sides of the shoe bottom, said members being movable heightwise of the last away from the insole in response to wedging action of the wipers thereon in wiping the upper over the insole and being relatively adjustable widthwise of the last for operating on shoes of different widths.

110. In a lasting machine, the combination with wipers for wiping the margin of an upper inwardly over an insole on a last at the opposite sides of the shoe bottom, of members arranged to press the marginal portion of the insole close to the bottom of the last at the sides of the shoe bottom, said members being movable heightwise of the last away from the insole in response to wedging action of the wipers thereon in wiping the upper over the insole, and means for adjusting said members each independently of the other widthwise of the last for operating on shoes of different widths.

111. In a lasting machine, the combination with wipers for wiping the margin of an upper inwardly over an insole on a last at the opposite sides of the shoe bottom, of members arranged to press the marginal portion of the insole close to the bottom of the last at the sides of the shoe bottom, arms supporting said members and mounted for swinging movements heightwise of the last each independently of the other, and spring means arranged to act on said arms to force the members toward the insole and yieldable in response to wedging action of the wipers on the different members to permit the members to be forced away from the insole by the wipers.

112. In a lasting machine, flexible means arranged to extend around an end of a last in clamping relation to an upper on the last, and a coil spring extending around said flexible means to hold said means pressed yieldingly against the upper.

113. In a lasting machine, a flexible band for embracing and clamping an upper around an end of a last, and a coil spring extending around said band at the outer side thereof to hold the band pressed yieldingly against the upper.

114. In a lasting machine, a flexible band for embracing and clamping an upper around an end of a last, a plurality of members arranged to extend in a series around the end of the last to control said band, and a coil spring extending around the series of members to hold the band pressed yieldingly against the upper.

115. In a lasting machine, a flexible band for embracing and clamping an upper around an end of a last, a plurality of spring fingers arranged to extend heightwise of the last in a series about the end of the last to control said band, and a coil spring extending around the series of fingers at the outer sides thereof to assist in holding the band pressed yieldingly against the upper.

116. In a lasting machine, a flexible band for embracing and clamping an upper around an end of a last, a plurality of spring fingers arranged to extend heightwise of the last in a series about the end of the last at the outer side of said band to control the band, a coil spring extending around the series of fingers at the outer sides thereof to assist in holding the band pressed yieldingly against the upper, and a plurality of members interposed between the spring and said fingers and supported by the spring.

117. In a lasting machine, a flexible band for embracing and clamping an upper around an end of a last, a coil spring extending around said band at the outer side thereof to hold the band pressed yieldingly against the upper, members mounted for movements widthwise of the last and to which the opposite ends of said spring are connected, and spring means tending to move said members inwardly toward each other.

118. In a lasting machine, a flexible band for embracing and clamping an upper around an end of a last, a plurality of spring fingers arranged to extend heightwise of the last in a series about the end of the last to control said band, a coil spring extending around the series of fingers at the outer sides thereof to assist in holding the band pressed yieldingly against the upper, arms mounted for swinging movements widthwise of the last and to which the opposite ends of said spring are connected, and spring means tending to swing said arms inwardly toward each other.

119. In a lasting machine, means for clamping an upper against a last around an end of the last, said clamping means comprising a plurality of members arranged to extend in a series about the end of the last, and a coil spring extending around the series of members to press them inwardly toward the last.

120. In a lasting machine, means for clamping an upper against a last around an end of the last, said clamping means comprising a plurality of spring fingers arranged to extend heightwise of the last in a series about the end of the last, and a coil spring extending around the series of fingers at the outer sides thereof to press them inwardly toward the last.

121. In a lasting machine, means for wiping an upper around the toe end of a last heightwise of the last, said means comprising a toe band, a plurality of fingers arranged to extend heightwise of the last in a series about the toe to control said toe band, and a coil spring extending around the series of fingers to support them yieldingly against wedging action of the last on the toe band.

122. In a lasting machine, means for wiping an upper around the toe end of a last heightwise of the last, said means comprising a toe band, a plurality of fingers arranged to extend heightwise of the last in a series about the toe to control said toe band, a coil spring extending around the series of fingers to support them yieldingly against wedging action of the last on the toe band, members connected to the opposite ends of said spring to control it, and spring means against the resistance of which said members are movable outwardly in response to wedging action of the last on the toe band.

123. In a lasting machine, means for wiping an upper around the toe end of a last heightwise of the last, said means comprising a plurality of members arranged to extend in a series around the toe end of the last and yieldable outwardly in response to wedging action of the last thereon, and a coil spring extending around the series of members to support them yieldingly against the wedging action of the last.

124. In a lasting machine, the combination with means for lasting the forepart of a shoe on a last, of members arranged to engage the shoe upper at the opposite sides of the forepart prior to the lasting operation to determine the position of the last and shoe laterally with respect to the lasting means.

125. In a lasting machine, the combination with means for lasting the forepart of a shoe on a last, of members arranged to engage the shoe upper at the opposite sides of the forepart to determine the position of the last and shoe laterally with respect to the lasting means, and means for imparting to the last and shoe heightwise movement away from said members in the lasting operation.

126. In a lasting machine, the combination with means for lasting the forepart of a shoe on a last, of members arranged to engage the shoe upper at the opposite sides of the forepart to determine the position of the last and shoe laterally with respect to the lasting means, and means for effecting simultaneously equalized movements of said members toward or from each other to adjust them for lasts and shoes of different widths.

127. In a lasting machine, the combination with means for lasting the forepart of a shoe on a last, of members arranged to engage the shoe upper at the opposite sides of the forepart to determine the position of the last and shoe laterally with respect to the lasting means, arms supporting said members and connected for equalized swinging movements toward or from each other, spring means tending to swing said arms apart, and mechanism for adjustably limiting the movements of said arms away from each other.

128. In a lasting machine, the combination with means for lasting the forepart of a shoe on a last, of members arranged to engage the shoe upper at the opposite sides of the forepart to determine the position of the last and shoe laterally with respect to the lasting means, arms supporting said members and connected for equalized swinging movements toward or from each other, spring means tending to swing said arms apart, and an adjustable stop arranged to contact with one of said arms to limit movements of the arms away from each other, said stop being yieldable to permit said members to be forced apart by wedging action of a last and shoe thereon.

129. In a lasting machine, the combination with means for lasting the forepart of a shoe on a last, of members arranged to engage the shoe upper at the opposite sides of the forepart to determine the position of the last and shoe laterally with respect to the lasting means, and means for imparting to the last and shoe heightwise movement away from said members in the lasting operation, the members being yieldable in response to contact of the shoe therewith upon reverse movement of the shoe after the lasting operation.

130. In a lasting machine, the combination with means for wiping an upper heightwise of a last around the toe end of the last, and means for effecting relative movement of said wiping means and the last heightwise of the last to perform the wiping operation, of members arranged to engage the upper at the opposite sides of the forepart to determine the position of the last and shoe laterally prior to the wiping operation.

131. In a lasting machine, the combination with means for wiping an upper heightwise of a last around the toe end of the last, wipers for wiping the margin of the upper around the toe inwardly over the bottom of the last, and means for depressing the last relatively to said wiping means and wipers, of devices positioned above the wipers and arranged to engage the upper at the opposite sides of the forepart to determine the position of the last and shoe laterally when the work is presented to the machine.

132. In a lasting machine, the combination with wipers for wiping the margin of an upper inwardly over the bottom of a last around the toe end of the last with the last positioned bottom upward, of devices positioned over said wipers for engaging the upper at the opposite sides of the forepart to determine the position of the last and shoe laterally with respect to said wipers.

133. In a lasting machine, the combination with wipers for wiping the margin of an upper inwardly over the bottom of a last around the toe end of the last with the last positioned bottom upward, of members arranged to engage the upper at the opposite sides of the forepart to determine the position of the last and shoe laterally with respect to said wipers, arms supporting said members and mounted for swinging movements over the wipers toward or from each other, and adjusting means for imparting to said arms simultaneously equalized swinging movements to vary the distance between said members for shoes of different widths.

134. In a lasting machine, the combination with wipers for wiping the margin of an upper inwardly over the bottom of a last around the toe end of the last with the last positioned bottom upward, of members arranged to engage the upper at the opposite sides of the forepart to determine the position of the last and shoe laterally with respect to said wipers, arms supporting said members and mounted for swinging movements over the wipers toward or from each other, said arms being connected for equalized swinging movements toward or from each other, spring means tending to swing the arms apart, and a member arranged to act on one of the arms to limit their movements under the influence of said spring means, said member being adjustable to vary the positions of the arms for shoes of different widths.

135. In a lasting machine, the combination with wipers for wiping the margin of an upper inwardly over the bottom of a last around the toe end of the last, and an upwiping device arranged to wipe the upper heightwise of the toe in response to heightwise movement of the last and so mounted as to permit it to be displaced laterally in one direction or the other by the action of the shoe thereon, of devices arranged to engage the upper at the opposite sides of the forepart to centralize the last and shoe laterally with respect to said wipers.

136. In a lasting machine, the combination with wipers for wiping the margin of an upper inwardly over the bottom of a last around the toe end of the last, and an upwiping device arranged to wipe the upper heightwise of the toe in response to heightwise movement of the last and so mounted as to permit it to be displaced laterally in one direction or the other by the action of the shoe thereon, of devices arranged to engage the upper at the opposite sides of the forepart to centralize the last and shoe laterally with respect to said wipers prior to the heightwise movement of the last, said devices being connected for equalized movements toward or from each other, and means for effecting such movements of the devices to adjust them for shoes of different widths.

137. In a lasting machine, the combination with means for lasting the forepart of a shoe on a last, means for depressing the last and shoe relatively to said lasting means, and sidelasting mechanisms movable into engagement with the sides of the shoe before it is thus depressed, of means arranged to engage the opposite sides of the forepart of the shoe to position it laterally and prevent its displacement by the side-lasting mechanisms.

138. In a lasting machine, the combination with wipers for wiping the margin of an upper inwardly over the bottom of a last around the toe end of the last, means for moving the last and shoe heightwise into position for the operation of said wipers thereon, and side-lasting mechanisms movable into engagement with the sides of the shoe prior to its heightwise movement, of devices arranged to engage the shoe at the opposite sides of the forepart prior to its heightwise movement to position it laterally and prevent its displacement by the side-lasting mechanisms.

139. In a lasting machine, the combination with a shoe support and lasting means, of devices arranged to engage the upper of a shoe on said support in jig holes provided at the opposite sides of the forepart to position the upper relatively to the lasting means, said devices being mounted for movements widthwise of the shoe to withdraw them from the jig holes.

140. In a lasting machine, the combination with a shoe support and lasting means, of devices arranged to engage the upper of a shoe on said support in jig holes provided at the opposite sides of the forepart to position the upper relatively to the lasting means, said devices being mounted for swinging movements widthwise of the shoe about axes extending heightwise of the shoe to withdraw them from the jig holes.

141. In a lasting machine, the combination with a shoe support and lasting means, of members arranged to engage the upper of a shoe on said support in jig holes provided at the opposite sides of the forepart to position the upper relatively to the lasting means, arms supporting said members and connected for equalized swinging movements widthwise of the shoe, and means for swinging said arms to withdraw the members from the jig holes.

142. In a lasting machine, the combination with a shoe support and lasting means, of members arranged to engage the upper of a shoe on said support in jig holes provided at the opposite sides of the forepart to position the upper relatively to the lasting means, said members being movable widthwise of the shoe to withdraw them from the jig holes, and means for adjusting said members toward or from each other for shoes of different sizes.

143. In a lasting machine, the combination with a shoe support and lasting means, of members arranged to engage the upper of a shoe on said support in jig holes provided at the opposite sides of the forepart to position the upper relatively to the lasting means, arms supporting said members and connected for equalized swinging movements widthwise of the shoe, and means for swinging said arms to adjust the members for shoes of different sizes.

144. In a lasting machine, the combination with a shoe support and lasting means, of members arranged to engage the upper of a shoe on said support in jig holes provided at the opposite sides of the forepart to position the upper relatively to the lasting means, said members being relatively adjustable lengthwise of the shoe.

145. In a lasting machine, the combination with a shoe support and lasting means, of members arranged to engage the upper of a shoe on said support in jig holes provided at the opposite sides of the forepart to position the upper relatively to the lasting means, and arms supporting said members and mounted for swinging movements widthwise of the shoe to withdraw the members from the jig holes, the members being adjustable relatively to said arms, each independently of the other, in directions lengthwise of the shoe.

146. In a lasting machine, the combination with a shoe support and lasting means, of jig pins arranged to engage the upper of a shoe on said support in jig holes provided at the opposite sides of the forepart to position the upper relatively to the lasting means, members on which said jig pins are mounted, and arms supporting said members and mounted for swinging movements widthwise of the shoe, said members being supported on the arms for swinging movements relatively to the arms about axes extending heightwise of the shoe to adjust the jig pins lengthwise of the shoe.

147. In a lasting machine, the combination with a shoe support and lasting means, of jig pins arranged to engage the upper of a shoe on said support in jig holes provided at the opposite sides of the forepart to position the upper relatively to the lasting means, members on which said jig pins are mounted, arms supporting said members and connected for equalized swinging movements about axes extending heightwise of the shoe, and means for adjusting said arms about their axes for shoes of different sizes, said members being supported on the arms for swinging movements about axes extending heightwise of the shoe to adjust the jig pins lengthwise of the shoe.

148. In a lasting machine, the combination with a shoe support and wipers for wiping the margin of the toe end of the upper of a shoe on said support into lasted position, of jig pins arranged to extend widthwise of the shoe and to engage the margin of the toe end of the upper in jig holes provided therein to position the upper relatively to the wipers, and members supporting said jig pins and mounted for movements in directions substantially parallel to the plane of the wipers to withdraw the jig pins from the upper.

149. In a lasting machine, the combination with a shoe support and wipers for wiping the margin of the toe end of the upper of a shoe on said support into lasted position, of jig pins arranged to extend widthwise of the shoe and to engage the margin of the toe end of the upper in jig holes provided therein to position the upper relatively to the wipers, arms supporting said jig pins and connected for simultaneous swinging movements in paths substantially parallel to the plane of the wipers to withdraw the jig pins from the upper, spring means tending to swing said arms toward each other, and a stop arranged to limit movements of the arms toward each other and adjustable to vary the positions of the arms.

150. In a power-operated lasting machine, the combination with a shoe support and lasting means, of devices arranged to engage the upper of a shoe on said support in jig holes provided therein to position the upper relatively to the lasting means, a member movable by the operator to start the power operation of the machine, and mechanism arranged to be operated by the movement of said member to withdraw said devices from the jig holes in the upper.

151. In a power-operated lasting machine, the combination with a shoe support, and means for lasting the toe end of a shoe on said support, of members arranged to engage the margin of the shoe upper in jig holes provided therein at the opposite sides of the forepart to position the upper relatively to the lasting means, a device for engaging the bottom of the shoe in the lasting operation, said device being mounted for movement by the operator to a position opposite the bottom of the shoe, mechanism for starting the power operation of the machine by said movement of the device, and mechanism for also withdrawing said members from the jig holes in the upper by said movement of the device.

152. In a lasting machine, the combination with a shoe support and lasting means, of devices arranged to engage the upper of a shoe on said support in jig holes provided therein to position the upper relatively to the lasting means, a member having means for engaging the bottom of the shoe in the lasting operation and movable by the operator to a position opposite the bottom of the shoe, and means for withdrawing said devices from the jig holes in the upper by the movement of said member.

153. In a lasting machine, the combination with a shoe support, and means for lasting the toe end of a shoe on said support, of jig pins arranged to engage the margin of the upper in jig holes provided therein at the opposite sides of the toe to position the upper relatively to the lasting means, arms supporting said jig pins and mounted for movements widthwise of the shoe to withdraw the jig pins from the upper, a member provided with means for engaging the bottom of the forepart of the shoe in the lasting operation and mounted for movement by the operator to a position opposite the bottom of the shoe, and mechanism controlled by said member for operating said arms to withdraw the jig pins from the upper.

154. In a power-operated lasting machine, the combination with a shoe support and lasting mechanism, of a device for engaging the bottom of a shoe on said support in the lasting operation, said device being movable by the operator to a position opposite the bottom of the shoe, mechanism for starting the power operation of the machine arranged to be operated by such movement of the device, and means movable at the will of the operator to render said device in its movement ineffective to operate said mechanism.

155. In a power-operated lasting machine, the combination with a shoe support and lasting mechanism, of a device for engaging the bottom of a shoe on said support in the lasting operation, said device being movable by the operator to a position opposite the bottom of the shoe, and mechanism for starting the power operation of the machine arranged to be operated by such movement of the device, a portion of said mechanism being displaceable at the will of the operator to render said device in its movement ineffective to operate the mechanism.

156. In a power-operated lasting machine, the combination with a shoe support and lasting mechanism, of a member for engaging the bottom of a shoe on said support to control it in the lasting operation, an arm supporting said member and mounted for swinging movement by the operator to carry the member to a position opposite the bottom of the shoe, and mechanism for starting the power operation of the machine arranged to be operated by the swinging of said arm, a portion of said mechanism being displaceable by the operator to render the arm in its swinging movement ineffective to operate the mechanism.

157. In a power-operated lasting machine, the combination with a shoe support and lasting mechanism, of a member for engaging the bottom of a shoe on said support to control it in the lasting operation, an arm supporting said member and mounted for swinging movement by the operator to carry the member to a position opposite the bottom of the shoe, and mechanism for starting the power operation of the machine arranged to be operated by the swinging of said arm, said mechanism comprising members one of which is interposed in the path of another and is movable at the will of the operator out of said path to render the arm in its swinging movement ineffective to operate the mechanism.

BERNHARDT JORGENSEN.